(12) United States Patent
Shimamura et al.

(10) Patent No.: US 9,569,687 B2
(45) Date of Patent: Feb. 14, 2017

(54) IMAGE ANALYSIS DEVICE, IMAGING SYSTEM AND NON-TRANSITORY RECORDING MEDIUM GENERATING AN INDEX INDICATING A CARDIAC STATUS WITH RESPECT TO FRAME IMAGES

(71) Applicant: KONICA MINOLTA, INC., Tokyo (JP)

(72) Inventors: Kenta Shimamura, Takatsuki (JP); Osamu Toyama, Kakogawa (JP); Koichi Fujiwara, Osaka (JP); Hiroshi Yamato, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 22 days.

(21) Appl. No.: 14/661,453

(22) Filed: Mar. 18, 2015

(65) Prior Publication Data

US 2015/0269726 A1   Sep. 24, 2015

(30) Foreign Application Priority Data

Mar. 19, 2014  (JP) .................................. 2014-056119

(51) Int. Cl.
*G06K 9/00* (2006.01)
*G06K 9/46* (2006.01)
*G06T 7/00* (2006.01)

(52) U.S. Cl.
CPC ........... *G06K 9/4604* (2013.01); *G06T 7/0016* (2013.01); *G06T 2207/10116* (2013.01); *G06T 2207/30048* (2013.01); *G06T 2207/30061* (2013.01)

(58) Field of Classification Search
None
See application file for complete search history.

(56) References Cited

U.S. PATENT DOCUMENTS

| 2009/0097731 | A1 | 4/2009 | Sanada et al. | |
| 2012/0130238 | A1* | 5/2012 | Muraoka | A61B 6/4233 600/436 |
| 2014/0133717 | A1* | 5/2014 | Kabus | A61B 6/5264 382/128 |

FOREIGN PATENT DOCUMENTS

WO   WO 2007/078012 A1   1/2007

* cited by examiner

*Primary Examiner* — Atiba O Fitzpatrick
(74) *Attorney, Agent, or Firm* — Brinks Gilson & Lione

(57) ABSTRACT

An image analysis device includes: an acquiring unit configured to acquire a moving image showing a variation of a respiratory status, the moving image being formed with frame images including an image of a heart; an image analyzing unit configured to generate a first index indicating a cardiac status with respect to each of the frame images; and an index analyzing unit configured to derive a second index indicating lung function from a change caused in the first indexes by the respiratory status.

33 Claims, 22 Drawing Sheets

FIG. 24

COPD PATIENT

CHANGES CAUSED IN POSITION OF HEART BY HEARTBEAT

| | |
|---|---|
| HEARTBEAT 1 | 14 |
| HEARTBEAT 2 | 13 |
| HEARTBEAT 3 | 15 |
| HEARTBEAT 4 | 22 |
| HEARTBEAT 5 | 20 |
| HEARTBEAT 6 | 21 |

| | |
|---|---|
| Max | 22 |
| Min | 13 |
| Average | 17.5 |
| Median | 17.5 |

DIFFERENCES IN TEMPORAL VARIATION CAUSED IN POSITION OF HEART BY HEARTBEAT

| | |
|---|---|
| Max-Min (DIFFERENCE) | 9 |
| Max/Min (RATIO) | 1.6923 |
| STANDARD DEVIATION $\sigma$ | 3.594 |

COPD PATIENT

CHANGES CAUSED IN POSITION OF HEART BY HEARTBEAT

| | |
|---|---|
| HEARTBEAT 1 | 12 |
| HEARTBEAT 2 | 12 |
| HEARTBEAT 3 | 12 |
| HEARTBEAT 4 | 14 |
| HEARTBEAT 5 | 12 |
| HEARTBEAT 6 | 12 |

| | |
|---|---|
| Max | 14 |
| Min | 12 |
| Average | 12.3 |
| Median | 12 |

DIFFERENCES IN TEMPORAL VARIATION CAUSED IN POSITION OF HEART BY HEARTBEAT

| | |
|---|---|
| Max-Min (DIFFERENCE) | 2 |
| Max/Min (RATIO) | 1.17 |
| STANDARD DEVIATION $\sigma$ | 0.75 |

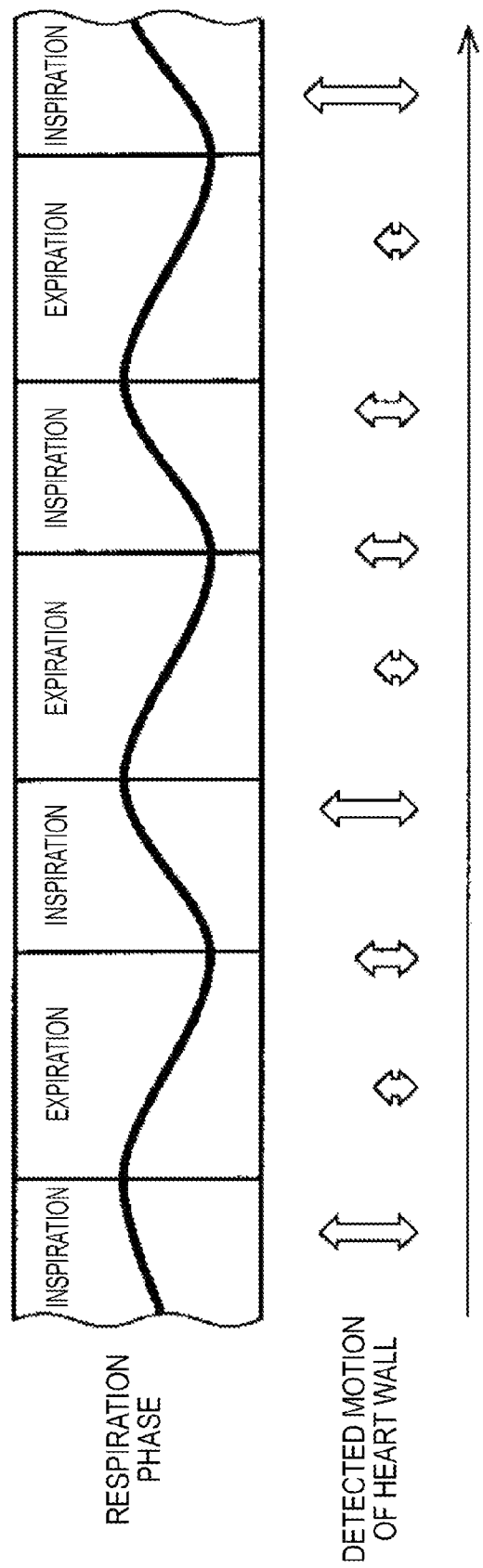

IMAGE ANALYSIS DEVICE, IMAGING SYSTEM AND NON-TRANSITORY RECORDING MEDIUM GENERATING AN INDEX INDICATING A CARDIAC STATUS WITH RESPECT TO FRAME IMAGES

The entire disclosure of Japanese Patent Application No. 2014-056119 filed on Mar. 19, 2014 including description, claims, drawings, and abstract are incorporated herein by reference in its entirety.

BACKGROUND OF THE INVENTION

Field of the Invention

The present invention relates to an image analysis device that generates an index indicating lung function, an imaging system, and an image analysis program.

Description of the Related Art

In determining whether a person is affected with a pulmonary disease such as chronic obstructive pulmonary disease (COPD), spirometry is performed in some cases. In spirometry, the ventilation volume of the person being tested is measured. From the measured ventilation volume, an index such as vital capacity or forced expiratory volume % in one second is generated in some cases, and a diagram called spirogram is created in other cases.

According to an invention disclosed in PCT/JP 2007/078012, blood flow information is generated. In the invention disclosed in PCT/JP 2007/078012, the site of the heart wall is automatically detected from a chest X-ray moving image, and a change in the site of the heart wall is regarded as movement of the heart wall. A heartbeat phase is estimated from the movement of the heart wall.

Spirometry is useful in diagnosing a pulmonary disease such as COPD. However, spirometry imposes a heavy strain on the person being tested, and reproducibility of test results is not preferable.

SUMMARY OF THE INVENTION

The present invention has been made to solve the above problem. An object of the present invention is to conduct a lung function test with high reproducibility, without imposing a heavy strain on the person being tested.

To achieve the abovementioned object, according to an aspect, an image analysis device reflecting one aspect of the present invention comprises: an acquiring unit configured to acquire a moving image showing a variation of a respiratory status, the moving image being formed with frame images including an image of a heart; an image analyzing unit configured to generate a first index indicating a cardiac status with respect to each of the frame images; and an index analyzing unit configured to derive a second index indicating lung function from a change caused in the first indexes by the respiratory status.

The above and other objects, features, aspects, and advantages of the present invention will be made more apparent below by the detailed description of the present invention in conjunction with the accompanying drawings.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a schematic diagram showing examples of temporal variations of the heart size and the like;

FIG. 24 is a schematic diagram showing examples of cardiac status indexes and lung function indexes;

FIG. 25 is a schematic diagram showing an example of motion of the heart wall before mapping is performed.

DESCRIPTION OF THE PREFERRED EMBODIMENTS

Hereinafter, an embodiment of the present invention will be described with reference to the drawings. However, the scope of the invention is not limited to the illustrated examples.

(1) Conception

(1.1) Respiratory Statuses

When a person is breathing, the diaphragm repeatedly contracts and relaxes in an alternate manner. When the diaphragm contracts, the pressure in the lungs decreases, and air flows into the lungs from outside the lungs. When the diaphragm relaxes, the pressure in the lungs increases, and air flows out of the lungs.

Figure 1:
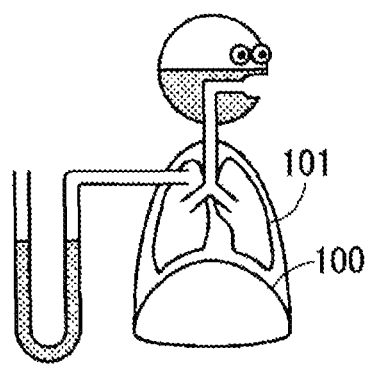
FIG. 1 shows the chest of a person at the time of a transition from an expiratory period to an inspiratory period.
Figure 2:
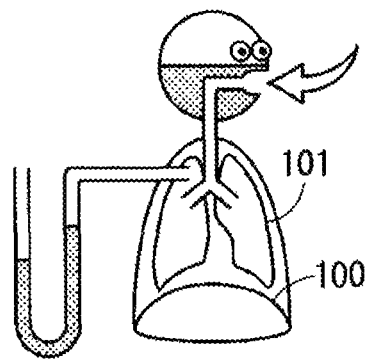
FIG. 2 shows the chest during an inspiratory period.
Figure 3:
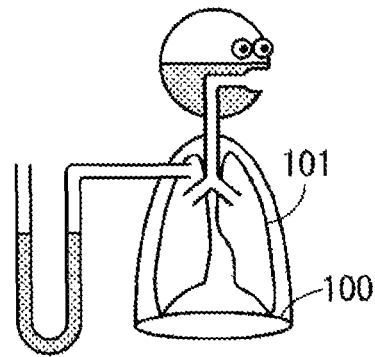
FIG. 3 shows the chest at the time of a transition from an inspiratory period to an expiratory period.

The schematic view in FIG. 1 shows the chest of a person at the time of a transition from an expiratory period to an inspiratory period. The schematic view in FIG. 2 shows the chest during an inspiratory period. The schematic view in FIG. 3 shows the chest at the time of a transition from an inspiratory period to an expiratory period.

As shown in FIG. 1, at the time of a transition from an expiratory period to an inspiratory period, the diaphragm 100 is located in a relatively high position, the lungs 101 are relatively small, and the pressure in the lungs 101 is the same as the pressure outside the lungs 101. As shown in FIG. 2, during an inspiratory period, the diaphragm 100 moves downward over time, the lungs 101 becomes larger over time, the pressure in the lungs 101 is lower than the pressure outside the lungs 101, and air flows into the lungs 101 from outside the lungs 101. As shown in FIG. 3, at the time of a transition from an inspiratory period to an expiratory period, the diaphragm 100 is located in a relatively low position, the lungs 101 are relatively large, and the pressure in the lungs 101 is the same as the pressure outside lungs 101. As described above, while a person is breathing, the size of the lungs and the pressure in the lungs vary, for example. As the size of the lungs and the pressure in the lungs vary, the positional relationship between the heart and the lungs also changes, for example.

(1.2) Change Caused in Cardiac Status by Respiratory Status

The heart is in contact with the lungs, and beats under the influence of the lungs. Therefore, the size of the heart and the position of the heart wall are affected by the pressure in the lungs and the positional relationship between the heart and the lungs, for example. Changes caused in the size of the heart and the position of the heart wall by heartbeat are affected by the pressure in the lungs and the positional relationship between the heart and the lungs, for example.

Figure 4:
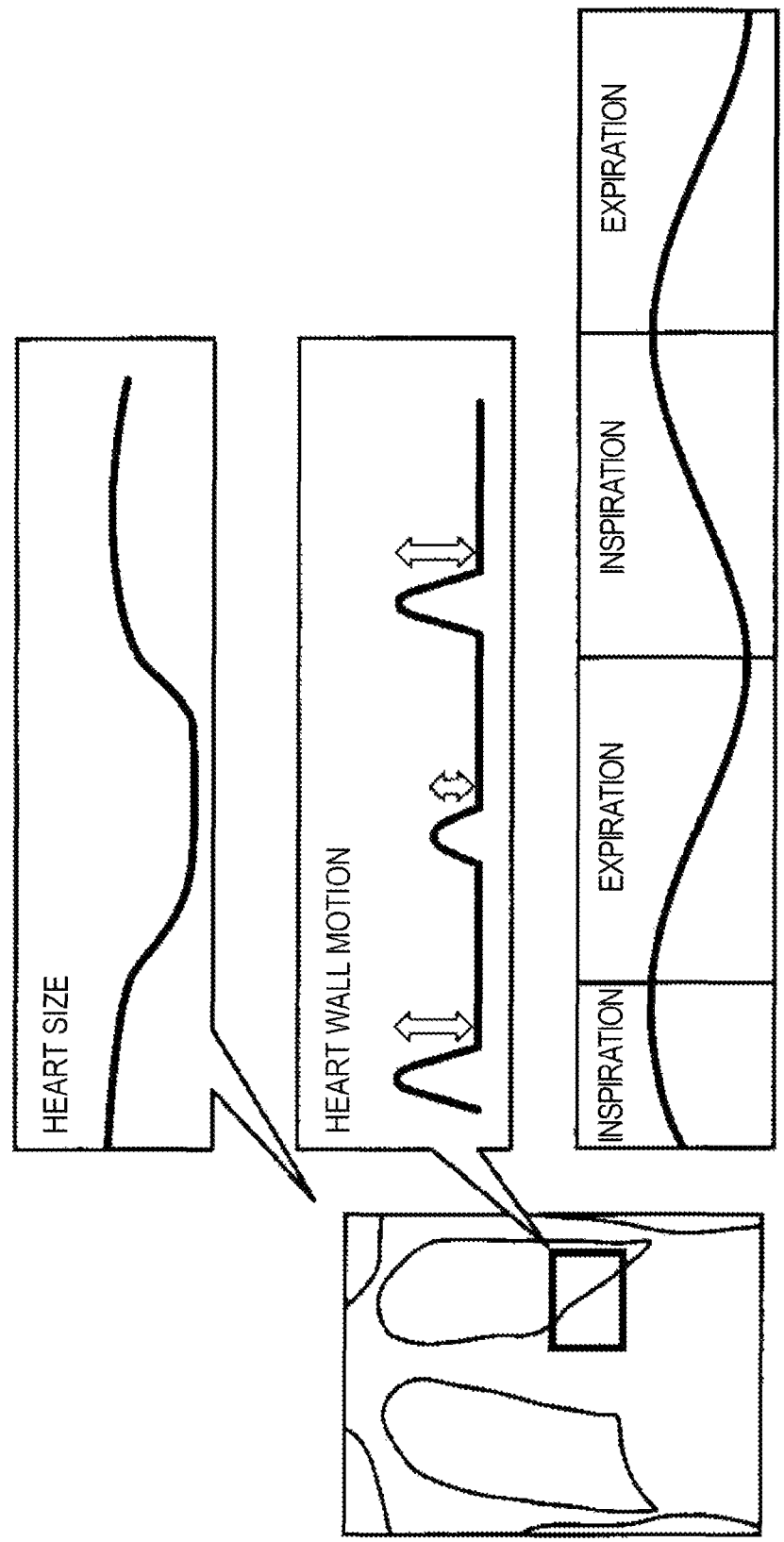

The schematic diagram in FIG. 4 shows examples of a chest X-ray image, a temporal variation of the heart size, a temporal variation of the position of the heart wall, and a temporal variation of the amount of air in the lungs. FIG. 4 indicates that changes (motion of the heart wall) caused in the heart size and the position of the heart wall by heartbeat are affected by the pressure in the lungs.

In the example shown in FIG. 4, the heart size and the motion of the heart wall are relatively large during an inspiratory period when the pressure in the lungs is low, and the heart size and the motion of the heart wall are relatively small during an expiratory period when the pressure in the lungs is high. Accordingly, a change in the pressure in the lungs between an inspiratory period and an expiratory period is estimated from a change in the heart size or in the motion of the heart wall between the inspiratory period and the expiratory period.

(1.3) Use of Change Caused in Cardiac Status by Respiratory Status

Chronic obstructive pulmonary disease (COPD) involves progressive airflow limitation accompanied by lung inflammation produced by inhalation of toxic particles, a toxic gas, or the like. Due to the airflow limitation, the change in the pressure in the lungs of a COPD patient between an inspiratory period and an expiratory period is larger than the change in the pressure in the lungs of a healthy person between an inspiratory period and an expiratory period. Accordingly, it is possible to determine whether a person is affected with COPD, from the change in the pressure in the lungs of the person between an inspiratory period and an expiratory period. The change in the pressure in the lungs between an inspiratory period and an expiratory period is estimated from the change in the heart size or in the motion of the heart wall between the inspiratory period and the expiratory period. Accordingly, the change in the heart size or in the motion of the heart wall between an inspiratory period and an expiratory period is useful in determining whether the person is affected with COPD. For example, if the change in the heart size or in the motion of the heart wall between an inspiratory period and an expiratory period is large, COPD is suspected.

The change in the heart size or in the motion of the heart wall between an inspiratory period and an expiratory period is also useful in analyzing lung function, as well as determining whether the person is affected with COPD. An index indicating a cardiac status other than the heart size and the motion of the heart wall may be used. A change caused by a respiratory status other than a change between an inspiratory period and an expiratory period may be used. An index indicating lung function is normally derived from a change caused in a cardiac status index due to a respiratory status.

(2) First Embodiment

(2.1) Imaging System

A first embodiment relates to an imaging system.

Figure 5:
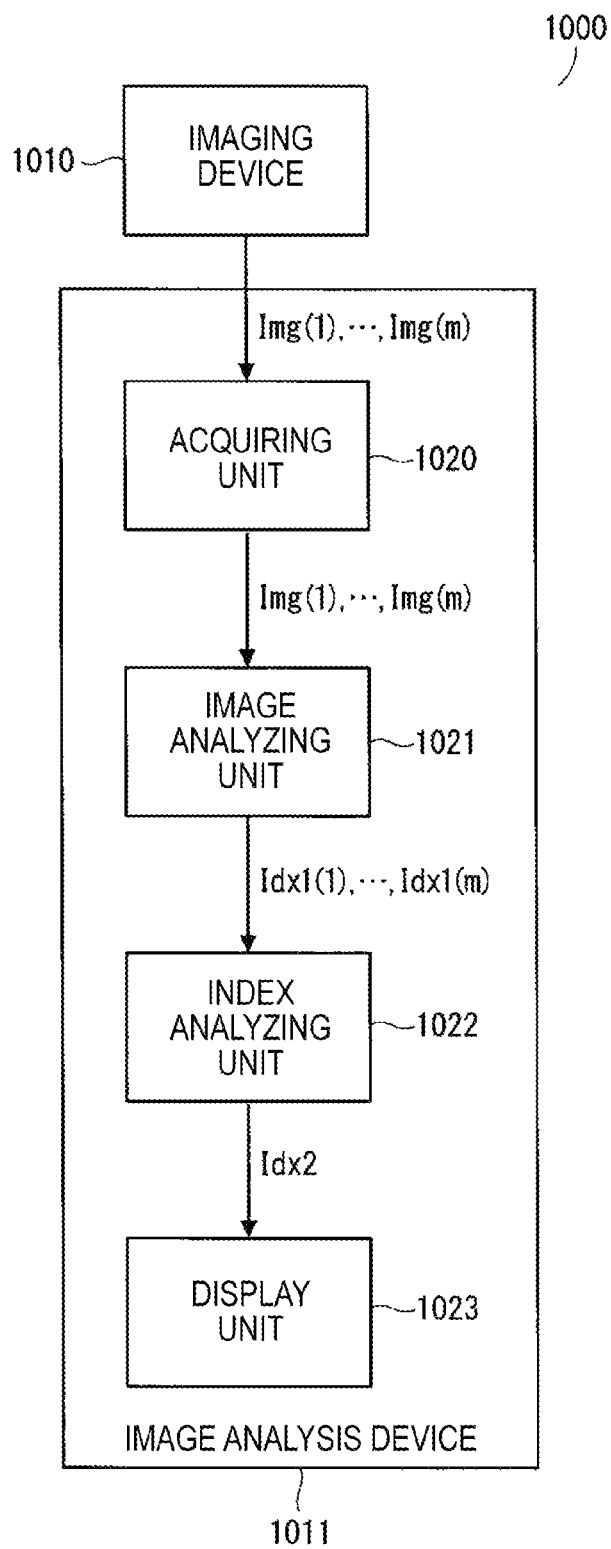
FIG. 5 is a block diagram of an imaging system of a first embodiment.

The block diagram in FIG. 5 shows an imaging system of the first embodiment.

The imaging system 1000 shown in FIG. 5 includes an imaging device 1010 and an image analysis device 1011. The imaging device 1010 generates a medical moving image. The image analysis device 1011 analyzes the medical moving image, and generates an index indicating lung function. With the image analysis device 1011, lung function can be examined with high reproducibility, but no heavy strain is imposed on the person being tested.

(2.2) Imaging Device

The imaging device 1010 generates a medical moving image by radiography. The imaging device 1010 generates X-rays from an X-ray tube, causes the generated X-rays to penetrate through a human body, and detects the X-rays having penetrated through the human body with a flat panel detector (FPD). With this, the imaging device 1010 images structures in the human body, and generates a frame image showing the structures in the human body. The imaging device 1010 may image structures in the body of a creature other than a human. The imaging device 1010 performs imaging twice or more, to generate a medical moving image including two or more frame images. A medical moving image is a two-dimensional moving image, and is represented by digital data. Each of the two or more frame images is a two-dimensional image, and is represented by two-dimensional image data. Alternatively, the imaging device 1010 may generate a medical moving image by a technology other than radiography. For example, the imaging device 1010 may generate a medical moving image by ultrasonic imaging, magnetic resonance imaging (MRI), computerized tomography (CT), or the like. A medical moving image may be a three-dimensional moving image. In a case where a medical moving image is a three-dimensional moving image, each of the two or more frame images is a three-dimensional image, and is represented by three-dimensional volume data.

(2.3) Object to be Imaged

A medical moving image is a chest X-ray moving image that is obtained by imaging of the heart of a person who is breathing normally. A medical moving image may also be obtained by imaging of the heart of a creature other than a human. A medical moving image may also be obtained by imaging of the heart of a person who is breathing with effort.

(2.4) Imaging Direction

A frontal image of the chest is to be taken. Accordingly, in a medical moving image, the region showing the contact portions between the heart and the lungs (the heart region) does not easily overlap the region showing the heart (the heart region) and the regions showing the lungs (the lung regions), and analysis of the region showing the contact portions between the heart and the lungs is facilitated. If an image of a side of the chest is taken, on the other hand, the region showing the contact portions between the heart and the lungs easily overlap the heart region and the lung regions, and it is difficult to analyze the contact portions between the heart and the lungs.

However, an image of a portion other than the front of the chest may be allowed to be taken. For example, an image of a side of the chest is allowed to be taken. In a case where a side of the chest is taken, the regions showing the portions of the heart that are not in contact with the lungs are preferably analyzed in an auxiliary manner. The regions showing the portions of the heart that are not in contact with the lungs are to be analyzed, because the regions showing the portions where the heart is not in contact with the lungs does not easily overlap the heart region and the lung regions, and the portions of the heart that are not in contact with the lungs expand when the lungs compress the heart.

(2.5) Imaging Region

In a case where the entire heart needs to be imaged so as to generate an index indicating a cardiac status, a region including the entire heart is imaged. In a case where the area of the entire heart is calculated as an index indicating a cardiac status, for example, a region including the entire heart is imaged even when the size of the heart is maximized, and a two-dimensional moving image is generated. In a case where the volume of the entire heart is calculated as an index indicating a cardiac status, a region including the entire heart is imaged even when the size of the heart is maximized, and a three-dimensional moving image is generated. Even if there is no need to image the entire heart so as to generate an index indicating a cardiac status, a region including the entire heart is preferably imaged. Accordingly, an index indicating a cardiac status is generated in a robust manner.

A region including only part of the heart is imaged in some cases. In such cases, a region including the necessary portion for generating an index indicating a cardiac status is imaged. In a case where the position of the heart wall is calculated, a region constantly including the heart wall is imaged. In a case where the width of the heart is calculated, a region including the necessary portion for calculating the width of the heart is imaged even when the width of the heart is maximized. In a case where the pixel value of the heart region is calculated, a region constantly including the portion from which the pixel value is to be derived is imaged.

In a case where a respiratory status is detected from a medical moving image, a region including the diaphragm and/or the lungs as well as the heart is imaged. In this manner, a respiratory status is detected in a robust manner.

(2.6) Imaging Time

A medical moving image is taken over one or more respiratory cycles, or more preferably, is taken over two or more respiratory cycles, or even more preferably, is taken over three or more respiratory cycles. In a case where a medical moving image is taken over one or more respiratory cycles, the medical moving image includes both a frame image taken during an inspiratory period and a frame image taken during an expiratory period, and the cardiac status during the inspiratory period and the cardiac status during the expiratory period are determined. As a cardiac status varies noticeably between an inspiratory period and an expiratory period, the determination of the cardiac status during the inspiratory period and the cardiac status during the expiratory period facilitates determination of a change caused in the cardiac status index by the respiratory status. In a case where a medical moving image is taken over two or more respiratory cycles, or over three or more respiratory cycles, even if the person being imaged is having difficulties in breathing normally, the possibility that the person can be imaged while breathing normally is increased. However, even if the time for imaging a medical moving image is shorter than one respiratory cycle, a change caused in the cardiac status index by a respiratory status might be detected.

The time required for taking a medical moving image is shorter than five respiratory cycles. With this, excessive exposure to radiation is prevented. However, even if the time required for taking a medical moving image is equal to or longer than five respiratory cycles, exposure to radiation might not become a problem. For example, when a medical moving image is generated through ultrasonic imaging, exposure to radiation does not become a problem.

(2.7) Frame Rate

The frame rate is 30 fps or higher. As a result, a change caused in a cardiac parameter by heartbeat is distinguished from a change caused in the cardiac parameter by a respiratory status, and the influence of heartbeat can be eliminated from cardiac parameters. However, even if the frame rate is lower than 30 fps, the influence of heartbeat can be eliminated from the cardiac parameters in some cases.

When each of two or more frame images is taken, X-rays having a rectangular waveform may be successively generated over one or more heartbeat cycles. As a result, all the statuses observed while the heart is beating are depicted in each of the two or more frame images, and the influence of heartbeat can be detected and removed from each of the two or more frame images. The frame rate in a case where X-rays having a rectangular waveform are generated is set so that the heart in one respiratory status is depicted in one frame image, and the heart in the other respiratory status is depicted in the other frame image. For example, in a case where a change in the cardiac status between an inspiratory period and an expiratory period is to be detected, the frame rate is set at 2 to 4 fps so that the heart during the inspiratory period is depicted in one frame image, and the heart during the expiratory period is depicted in the other frame image.

(2.8) End of Imaging

The taking of a medical moving image is ended when the imaging system 1000 determines that the necessary respiratory status for detecting a change caused in the cardiac status index by a respiratory status has been captured. The determination is performed based on motion of the diaphragm, the lungs, or the like in the medical moving image. The determination may be performed based on a result of detection performed by a detector other than the imaging device 1010. For example, the determination may be performed based on a result of detection performed by a ventilation meter. Alternatively, the determination may be performed based on a combination of motion of the diaphragm, the lungs, or the like in the medical moving image, and a result of detection performed by a detector other than the imaging device 1010. The taking of a medical moving image may be ended in accordance with an operation performed by an operator.

(2.9) Image Analysis Device

The image analysis device 1011 includes an acquiring unit 1020, an image analyzing unit 1021, an index analyzing unit 1022, and a display unit 1023. The acquiring unit 1020 acquires a medical moving image. The image analyzing unit 1021 analyzes the medical moving image, and generates an index indicating a cardiac status. The index analyzing unit 1022 analyzes the index indicating a cardiac status, and generates an index indicating lung function. The display unit 1023 displays the index indicating lung function.

(2.10) Acquiring Unit

The acquiring unit 1020 performs communication, and acquires a medical moving image directly from the imaging device 1010, or from the imaging device 1010 via a device other than the imaging device 1010, such as an image server. Alternatively, the acquiring unit 1020 may acquire a medical moving image by reading a recording medium such as an optical disk having the medical moving image recorded thereon.

(2.11) Image Analyzing Unit

The image analyzing unit 1021 derives an index Idx1($i$) indicating a cardiac status from each frame image Img(i) of two or more frame images Img(1) through Img(m). As a result, two or more cardiac status indexes Idx1(1) through Idx1($m$) are derived from the two or more frame images Img(1) through Img(m).

Each index Idx1($i$) indicating a cardiac status is the position of the heart wall, the heart size, the pixel value of the heart region, or the like, and is free of the influence of heartbeat. The heart size is the size of the entire heart. The heart size may be the size of part of the heart. For example, the heart size may be the size of the left ventricle, the left atrium, the right ventricle, or the right atrium. The heart size is determined by the width of the heart. The heart size may be determined by the area of the heart or the like. In a case where the medical moving image is a three-dimensional moving image, the heart size may be determined by the volume of the heart. The pixel value of the heart region reflects the thickness of the heart in the direction of X-ray transmission. This is because, as the thickness of the heart in the direction of X-ray transmission becomes greater, the amount of X-ray transmission decreases, and the pixel value of the heart region becomes larger.

(2.12) Image Analyzing Unit

Figure 6:
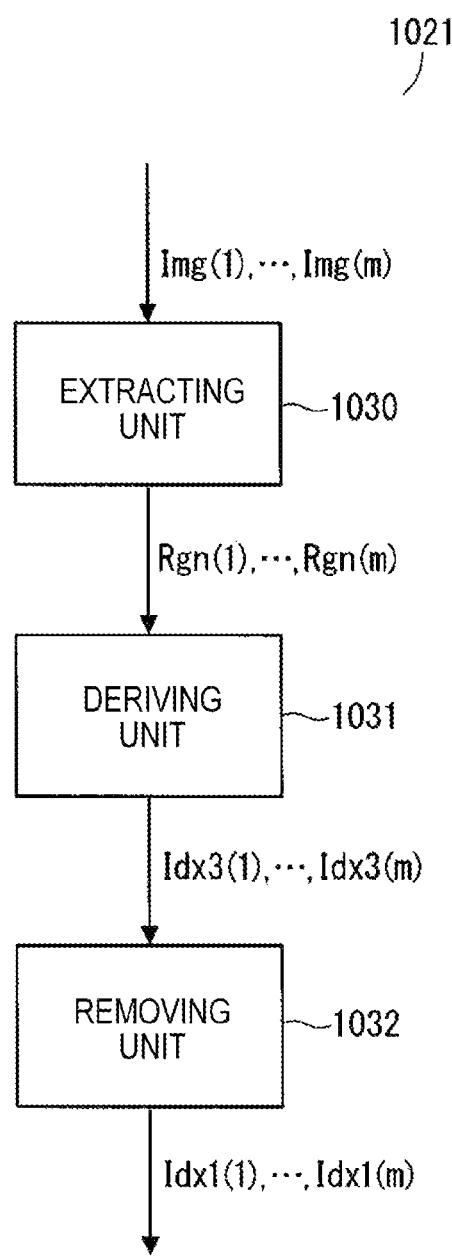
FIG. 6 is a block diagram of an image analyzing unit of the first embodiment.
Figure 7:
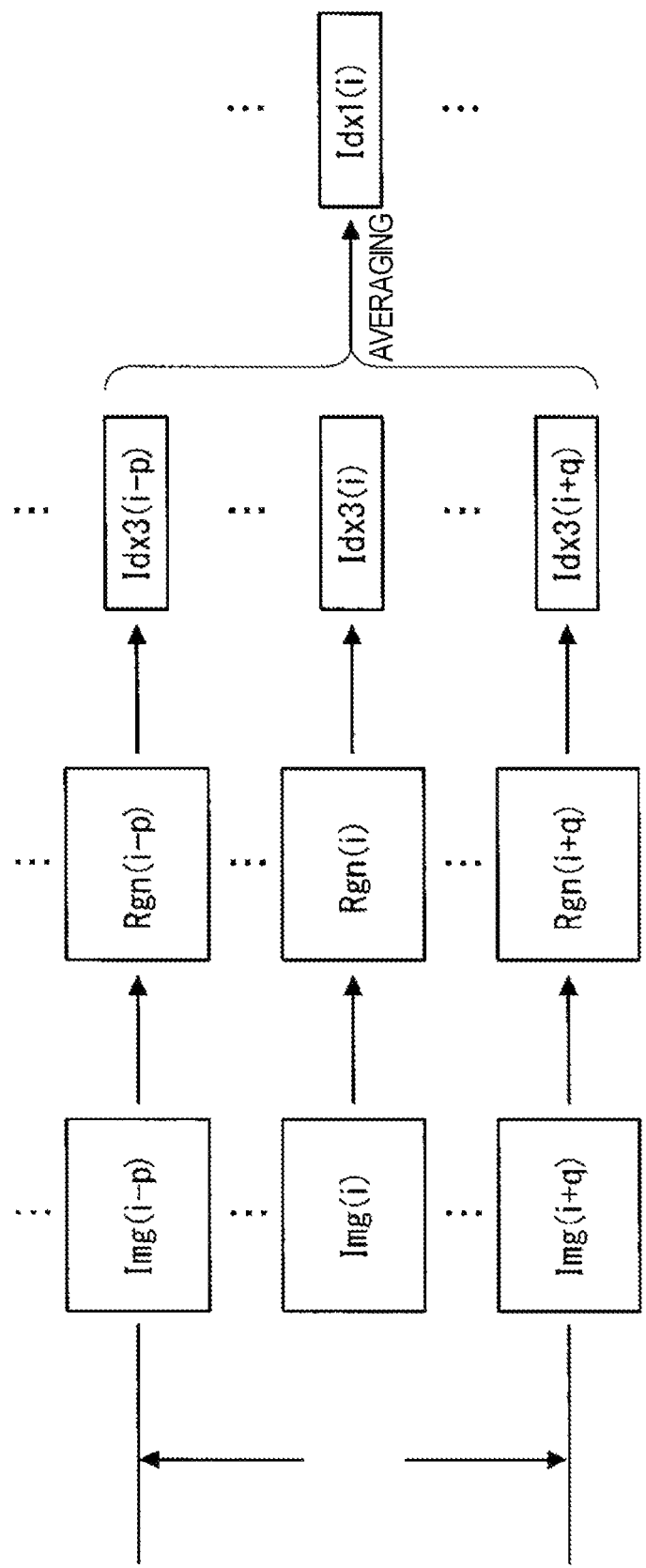
FIG. 7 is a schematic diagram showing the details of an image analysis according to the first embodiment.

The block diagram in FIG. 6 shows the image analyzing unit of the first embodiment. The schematic diagram in FIG. 7 shows the details of an image analysis according to the first embodiment.

The image analyzing unit 1021 shown in FIG. 6 includes an extracting unit 1030, a deriving unit 1031, and a removing unit 1032. The extracting unit 1030 extracts a heart region from a frame image. The deriving unit 1031 derives a cardiac parameter from the heart region. The removing unit 1032 removes the influence of heartbeat from the cardiac parameter, and generates an index indicating a cardiac status.

(2.13) Extracting Unit

The extracting unit 1030 extracts a heart region Rgn(i) from each frame image Img(i) of the two or more frame images Img(1) through Img(m). As a result, two or more heart regions Rgn(1) through Rgn(m) are extracted. In a case where two or more cardiac status indexes Idx1(1) through Idx1($m$) are generated even if two or more heart regions Rgn(1) through Rgn(m) are not extracted, the extracting unit 1030 may not be provided.

In a case where a heart region Rgn(i) is extracted, a rough heart region is extracted from a frame image Img(i) by template matching or the like, an edge portion where the pixel value greatly varies is detected from the rough heart region, the edge portion is regarded as the contour of the heart region, and the region defined by the edge portion is set as the heart region Rgn(i). The heart region Rgn(i) may be extracted by some other algorithm.

In a case where the medical moving image is a three-dimensional moving image, a rough heart region is extracted from a frame image Img(i) in accordance with a probabilistic atlas or the like, and a heart region Rgn(i) is extracted by a three-dimensional graph cut performed in the rough heart region. The heart region Rgn(i) may be extracted by some other algorithm. For example, the heart region Rgn(i) may be extracted from a cross-sectional image of the frame image Img(i) as in the case of a two-dimensional image.

(2.14) Deriving Unit

The deriving unit 1031 derives a cardiac parameter Idx3 ($i$) from a heart region Rgn(i) with respect to each frame image Img(i) of the two or more frame images Img(1) through Img(m). As a result, two or more cardiac parameters Idx3(1) through Idx3($m$) are generated.

Each cardiac parameter Idx3($i$) is the position of the heart wall, the heart size, the pixel value of the heart region, or the like, and is an index that indicates a cardiac status but includes the influence of heartbeat. Therefore, the cardiac parameter Idx3($i$) varies with respiratory statuses and heartbeat, and is not necessarily suitably used in detecting a change caused in the cardiac status by a respiratory status.

So as to generate the two or more cardiac parameters Idx3(1) through Idx3($m$) with respect to one portion of the heart, the two or more frame images Img(1) through Img(m)

are aligned in such a manner that the portion of the heart is depicted in the same positions in the two or more frame images Img(1) through Img(m). The alignment may not be performed. Instead, the sites where the portion of the heart is depicted in the two or more frame images Img(1) through Img(m) may be associated with one another.

(2.15) Position of the Heart Wall

The position of the heart wall is represented by the coordinates of the heart wall. The coordinates of the heart wall are the coordinates of the boundary between the heart region and the outside of the heart region. The coordinates of the heart wall may be the coordinates of a specific portion of the heart wall. The heart wall may be the left atrial wall, the left ventricular wall, the right atrial wall, or the right ventricular wall. The coordinates of the heart wall in contact with the lung being subjected to lung function analysis preferably serve as a cardiac parameter.

In a case where the medical moving image is a two-dimensional moving image, and the coordinate system is an orthogonal coordinate system, the coordinates are a combination of a coordinate value x representing a position in the x-direction and a coordinate value y representing a position in the y-direction. Typically, the x-direction is the lateral direction of each of the two or more frame images, and the y-direction is the longitudinal direction of each of the two or more frame images. Typically, the lateral direction is the horizontal direction for the person being imaged, and the longitudinal direction is the vertical direction for the person being imaged. In a case where the medical moving image is a two-dimensional moving image, and the coordinates are defined by a combination of two coordinate values x and y, the combination of the two coordinate values x and y may serve as a cardiac parameter while the number of dimensions remains two, or the coordinate value x or y selected from the two coordinate values x and y may serve as a cardiac parameter while the number of dimensions is changed to one. The coordinate values in the orthogonal coordinate system may be converted into coordinate values in another coordinate system. For example, the coordinate values in the orthogonal coordinate system may be converted into coordinate values in a polar coordinate system. In a case where the coordinate system is a polar coordinate system, the origin may be set as the reference point, and the distance from the reference point may be set as a cardiac parameter. The coordinate values may be represented by pixel numbers, or may be represented by actual lengths for the imaged person.

In a case where the medical moving image is a three-dimensional moving image, and the coordinates are defined by a combination of three coordinate values, the combination of the three coordinate values may serve as a cardiac parameter while the number of dimensions remains three, or a combination of two coordinate values or one coordinate value selected from the three coordinate values may serve as a cardiac parameter while the number of dimensions is changed to two or one.

(2.16) Width of the Heart

The width of the heart is the distance from one portion of the heart wall to another portion of the heart wall. In a case where the medical moving image is a two-dimensional moving image, the width of the heart is preferably determined from a region that does not overlap the regions showing the structures other than the heart, such as the spine and the diaphragm. Accordingly, the width of the heart is calculated with high precision. In a case where the medical moving image is a two-dimensional moving image, the distance in the x-direction from one portion to another portion located in the same position as the one portion in the y-direction is set as the width of the heart. With respect to each of two or more positions in the y-direction, the distance in the x-direction from one portion to another portion is determined. In this manner, two or more distances in the x-direction are determined, and the average value of the two or more distances in the x-direction may be set as the width of the heart. Instead of the distance in the x-direction from one portion to another portion located in the same position in the y-direction, the distance in the y-direction from one portion to another portion located in the same position in the x-direction may be set as the width of the heart. One oblique direction and another oblique direction that are not parallel to both the x-direction and the y-direction may be selected, and the distance in the other oblique direction from one portion to another portion located in the same position as the one portion in the one oblique direction may be set as the width of the heart.

(2.17) Area of the Heart

The area of the heart in a frame image Img(i) is the area of the heart region. The area of the heart is the area of the entire heart. The area of the heart may be the area of part of the heart. For example, the area of the heart may be the area of the left ventricle, the left atrium, the right ventricle, or the right atrium.

(2.18) Volume of the Heart

The volume of the heart is the volume of the heart region in a three-dimensional image. The volume of the heart may be estimated from a two-dimensional image. In a case where the volume of the heart is estimated from a two-dimensional image, the volume of the heart is estimated from the product of the area of the heart region and the pixel value of the heart region. This is because the pixel value of the heart region reflects the thickness of the heart in the direction of X-ray transmission. The volume of the heart is the volume of the entire heart. The volume of the heart may be the volume of part of the heart. For example, the volume of the heart may be the volume of the left ventricle, the left atrium, the right ventricle, or the right atrium.

(2.19) Pixel Value of a Heart Region

The pixel value of a heart region is the pixel value of the pixels belonging to the heart region in a transmission image such as a chest X-ray moving image. The pixel value of a heart region varies with the thickness of the heart in the direction of X-ray transmission, and accordingly, can serve as a cardiac parameter. Preferably, the pixel value of the pixels that belong to a region not overlapping the regions showing the structures other than the heart, such as the spine and the diaphragm, but do not belong to any region outside the heart region is set as a cardiac parameter. Specifically, the respective pixel values of two or more pixels are determined, so that two or more pixel values are obtained. The average value of the obtained two or more pixel values is set as the pixel value of the heart region. In this manner, the pixel value of the heart region is determined in a robust manner. The average value may be replaced with a representative value of some other kind. For example, the average value may be replaced with the median.

(2.20) Removing Unit

The removing unit 1032 removes the influence of heartbeat from the two or more cardiac parameters Idx3(1) through Idx3($m$). As a result, two or more cardiac status indexes Idx1(1) through Idx1($m$) are generated. The two or more cardiac status indexes Idx1(1) through Idx1($m$) indicate a temporal variation of an index Idx1($i$) indicating a cardiac status.

Each index Idx1($i$) of the two or more cardiac status indexes Idx1(1) through Idx1($m$) is generated as a result of removal of the influence of heartbeat from the position of the heart wall, the heart size, the pixel value of the heart region, or the like. That is, each index Idx1($i$) indicates a cardiac status, and does not include the influence of heartbeat. In view of this, each index Idx1($i$) indicating a cardiac status varies only with respiratory statuses, and is suitably used in detecting a change caused in the cardiac status by a respiratory status.

As shown in FIG. 7, in a case where an index Idx1($i$) indicating a cardiac status is generated, the average value of cardiac parameters Idx3($i$–$p$), . . . , Idx3($i$), . . . , and Idx3($i$+$q$) determined for frame images Img($i$-p), . . . , Img($i$), . . . , and Img($i$+q) taken in a period of one or more heartbeat cycles including the time when the frame image Img($i$) was taken, is calculated, and the calculated average value is set as the index Idx1($i$) indicating the cardiac status with respect to the frame image Img($i$). As a result, contribution of the cardiac parameters derived from frame images taken at the times of heartbeat is restricted, and the influence of heartbeat is removed. The average value may be replaced with a representative value of some other kind. For example, the average value may be replaced with the smallest value, the largest value, the median, or the like.

Alternatively, a time-domain low-pass filter may be applied to the two or more cardiac parameters Idx3(1) through Idx3($m$) so as to remove the influence of heartbeat.

Figure 8:
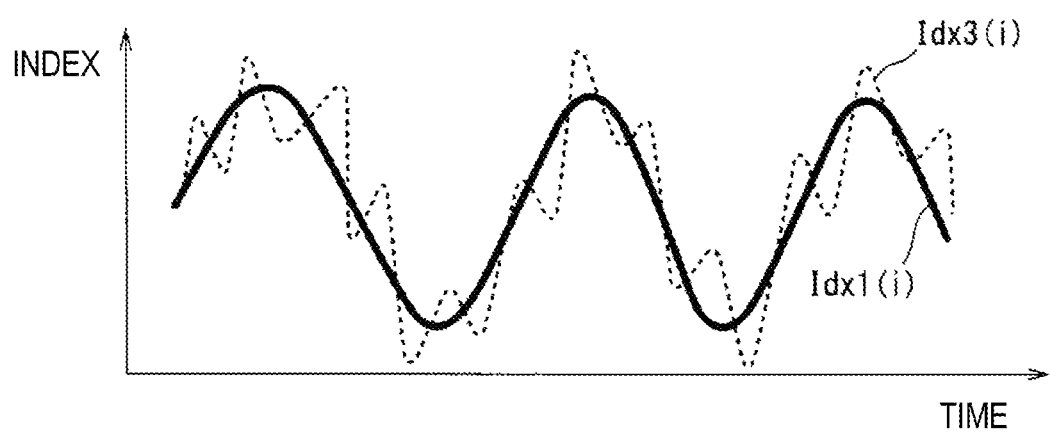
FIG. 8 is a schematic diagram showing an example of temporal variations of a cardiac parameter and an index indicating a cardiac status.

The schematic diagram in FIG. 8 shows an example of temporal variations of a cardiac parameter and an index indicating a cardiac status.

The cardiac parameter Idx3($i$) shown in FIG. 8 varies with time in cycles synchronized with relatively long respiratory cycles, and varies with time in cycles synchronized with relatively short heartbeat cycles. Therefore, in a case where a time-domain low-pass filter having a cutoff frequency that is intermediate between the respiratory frequency and the heartbeat frequency is applied to the cardiac parameter Idx3($i$), the temporal variation during the cycles synchronized with the heartbeat cycles is eliminated, and the temporal variation during the cycles synchronized with the respiratory cycles is maintained. As a result, the index Idx1($i$) indicating a cardiac status is generated as shown in FIG. 8.

(2.21) Index Analyzing Unit

The index analyzing unit 1022 sets an index Idx2 indicating lung function. The index Idx2 is derived from changes caused in the two or more cardiac status indexes Idx1(1) through Idx1($m$) by respiratory statuses.

In a case where the index Idx2 indicating lung function is generated, the difference Max–Min between the largest value Max and the smallest value Min of the two or more cardiac status indexes Idx1(1) through Idx1($m$) is calculated, and the calculated difference Max–Min is set as the index Idx2 indicating lung function. The difference Max–Min may be replaced with a difference of some other kind between the largest value Max and the smallest value Min. For example, the difference Max–Min may be replaced with a ratio Max/Min or Min/Max between the largest value Max and the smallest value Min. A difference between the largest value Max and the smallest value Min may be replaced with variation between the two or more cardiac status indexes Idx1(1) through Idx1($m$). A difference between the largest value Max and the smallest value Min may be replaced with the variance, the standard deviation, or the like of the two or more cardiac status indexes Idx1(1) through Idx1($m$).

Since the lung status and the cardiac status vary with respiratory statuses, not only the pressure in the lungs but also the volumes of the lungs, the position of the heart, and the like vary with respiratory statuses. Therefore, the correspondence relationship between respiratory statuses and cardiac statuses is complicated, and the process of precisely associating respiratory statuses with cardiac statuses is a complicated process. In a case where the medical moving image is a blurred two-dimensional moving image, or where an irregular respiratory status is detected, for example, the process of precisely associating respiratory statuses with cardiac statuses becomes even more complicated. An irregular respiratory status is detected when the person is breathing in a different manner from normal due to an individual difference, a disease, the conditions for breathing, or the like. Even when the person is breathing normally, an irregular respiratory status might be detected due to the conditions for imaging.

However, in a case where a difference between the largest value Max and the smallest value Min of the two or more cardiac status indexes Idx1(1) through Idx1($m$), or variation between the two or more cardiac status indexes Idx1(1) through Idx1($m$) is set as the index Idx2 indicating lung function, the process of precisely associating respiratory statuses with cardiac statuses is unnecessary, and therefore, the index Idx2 indicating lung function is generated by a simple process. Where the index Idx2 indicating lung function is generated without the process of precisely associating respiratory statuses with cardiac statuses, the index Idx2 often reflects lung function as accurately as a lung function index generated through the process of precisely associating respiratory statuses with cardiac statuses, and in some cases, reflects lung function more accurately than a lung function index generated through the process of precisely associating respiratory statuses with cardiac statuses.

When the index Idx2 indicating lung function is large, the change caused in the cardiac status index Idx1($i$) by a respiratory status is large, and there is a high possibility that the imaged person is affected with COPD. Accordingly, the index Idx2 indicating lung function is useful in determining whether a person is affected with COPD. For example, in a case where the index Idx2 indicating lung function is larger than a threshold value, COPD is suspected. This determination may be performed by the index analyzing unit 1022, or may be performed by a doctor who has referred to the index Idx2 indicating lung function.

Alternatively, the index Idx2 indicating lung function may be the difference Max–Avg between the largest value Max and the average value Avg of the two or more cardiac status indexes Idx1(1) through Idx1($m$), the difference Avg–Min between the average value Avg and the smallest value Min of the two or more cardiac status indexes Idx1(1) through Idx1($m$), a ratio Max/Avg or Avg/Max between the largest value Max and the average value Avg of the two or more cardiac status indexes Idx1(1) through Idx1(m), a ratio Min/Avg or Avg/Min between the average value Avg and the smallest value Min of the two or more cardiac status indexes Idx1(1) through Idx1(m), or the like.

The index analyzing unit 1022 may further generate a secondary index indicating lung function, while setting the lung function index Idx2 as a primary index indicating lung function. For example, a secondary index indicating whether COPD is suspected may be derived from the lung function index Idx2 serving as the primary index. In a case where an index indicating whether COPD is suspected is generated, COPD is not suspected when the index Idx2 indicating lung function is equal to or lower than a threshold value, and COPD is suspected when the index Idx2 indicating lung function is larger than the threshold value. Suspicion of COPD may be classified into three or more levels. For example, COPD is not suspected when the index Idx2 indicating lung function is equal to or lower than a first threshold value, COPD is suspected when the index Idx2 indicating lung function is larger than the first threshold value, but not larger than a second threshold value, and COPD is strongly suspected when the index Idx2 indicating lung function is larger than the second threshold value. The levels of suspicion of COPD are indicated in accordance with the existence/nonexistence of suspicion and degrees of suspicion, such as "not suspected", "slightly suspected", "suspected", and "strongly suspected". A suggestion for a test or treatment may be added to a level of suspicion of COPD. For example, if COPD is strongly suspected, a suggestion that a test is necessary may be added. Levels of suspicion of COPD may be represented by numerical values. For example, the index Idx2 indicating lung function may be reflected by x in a mathematical expression "1−exp(−x)" of a numerical value indicating a level of suspicion of COPD, and a numerical value indicating a level of suspicion of COPD may be determined. The numerical values to be determined according to the mathematical expression "1−exp(−x)" fall within the range of 0 to 1, and accordingly, each numerical value determined according to the mathematical expression "1−exp(−x)" is useful in expressing a degree of suspicion of COPD in percentage. For example, in a case where the index Idx2 indicating lung function is 2, and x in the mathematical expression "1−exp(−x)" of a numerical value indicating a level of suspicion of COPD is Idx2/2, 1−exp(−2/2) is equal to 0.63, and accordingly, the degree of suspicion of COPD is expressed as 63% in percentage. In a case where the index Idx2 indicating lung function is 4, and x in the mathematical expression "1−exp(−x)" of a numerical value indicating a level of suspicion of COPD is Idx2/2, 1−exp(−4/2) is equal to 0.86, and accordingly, the degree of suspicion of COPD is expressed as 86% in percentage. The mathematical expression may be modified.

A secondary index reflecting two or more primary indexes may be generated. For example, a result of an OR operation or an AND operation between the existence/nonexistence of COPD suspicion derived from a change in the heart size due to a respiratory status and the existence/nonexistence of COPD suspicion derived from a change in the heart size due to heartbeat may be set as the secondary index. Alternatively, the sum or the product of a change in the heart size due to a respiratory status and a change in the heart size due to heartbeat may be set as the secondary index.

(2.22) Display Unit

The display unit 1023 displays an analysis result on a display. An analysis result may be displayed when a doctor makes a diagnosis after the taking of a medical moving image is completed, or may be displayed while a medical moving image is being taken or immediately after the taking of a medical moving image is completed. In a case where an analysis result is displayed while a medical moving image is being taken or immediately after the taking of a medical moving image is completed, an engineer can check whether the taking of the medical moving image is successful, and determine whether a retake is necessary.

An analysis result may be printed on a printing medium such as a paper sheet. Alternatively, data of an analysis result, the display contents of the analysis result, and the print contents of the analysis result may be recorded on a recording medium such as a hard disk drive or an optical disk.

Figure 9:
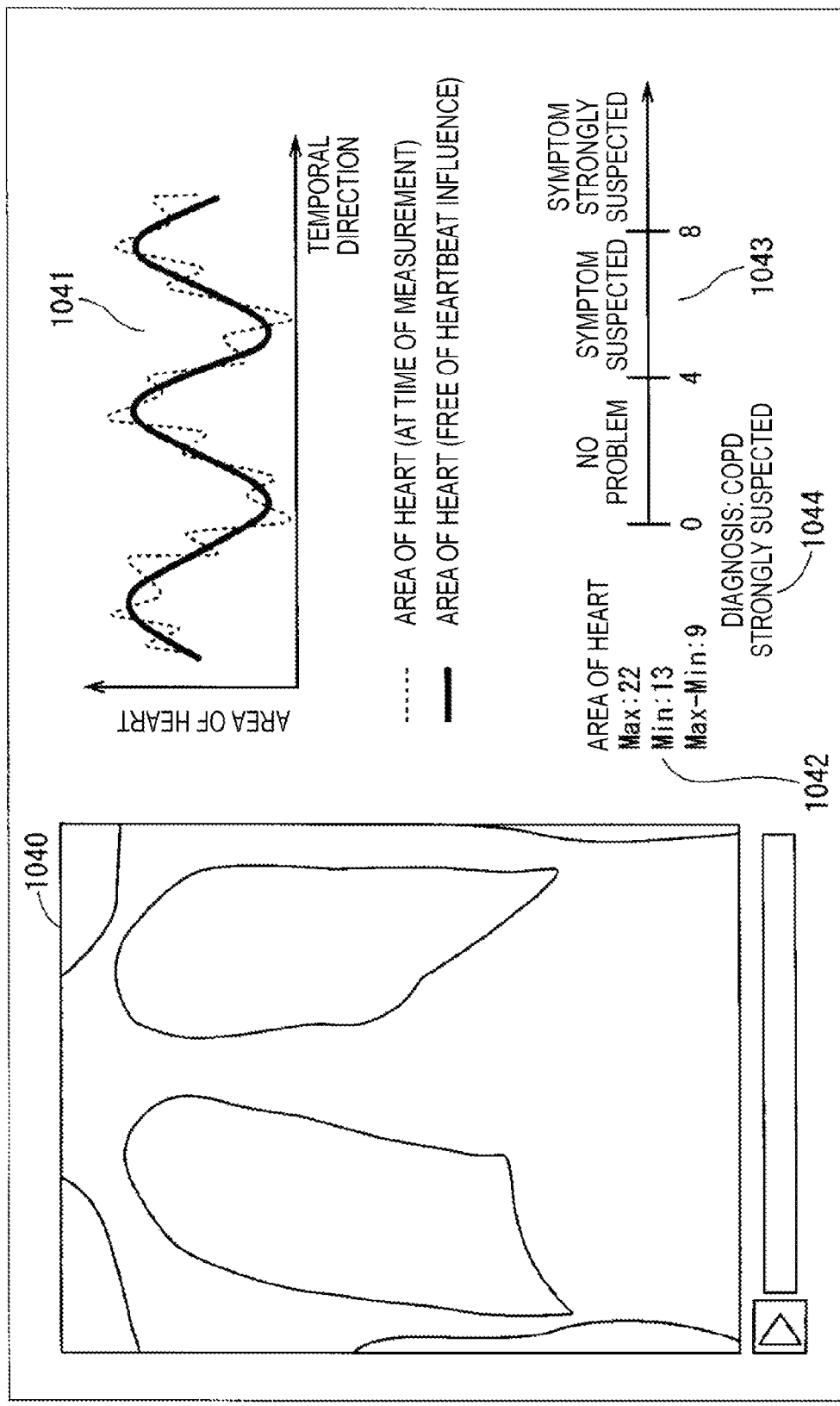
FIG. 9 is a schematic diagram showing an example of display of an analysis result in the first embodiment.

The schematic diagram in FIG. 9 shows an example of display of an analysis result.

The example of display shown in FIG. 9 includes a medical moving image reproduction area 1040, a display area 1041 of a cardiac parameter and a cardiac status index, a display area 1042 of a lung function index, a display area 1043 of lung function determination criteria, and a display area 1044 of a lung function determination result. The lung function determination criteria include threshold value information. In the example of display shown in FIG. 9, the index Idx1(i) indicating a cardiac status is the area of the heart in a frame image Img(i), the primary index Idx2 indicating lung function is the difference Max−Min between the largest value Max and the smallest value Min of the two or more cardiac status indexes Idx1(1) through Idx1(m). In the example of display shown in FIG. 9, the secondary index is the existence/nonexistence of suspicion of COPD. Results of analyses conducted on indexes indicating two or more kinds of cardiac statuses may be displayed separately from each other, or may be collectively displayed.

(2.23) Computer

Figure 10:
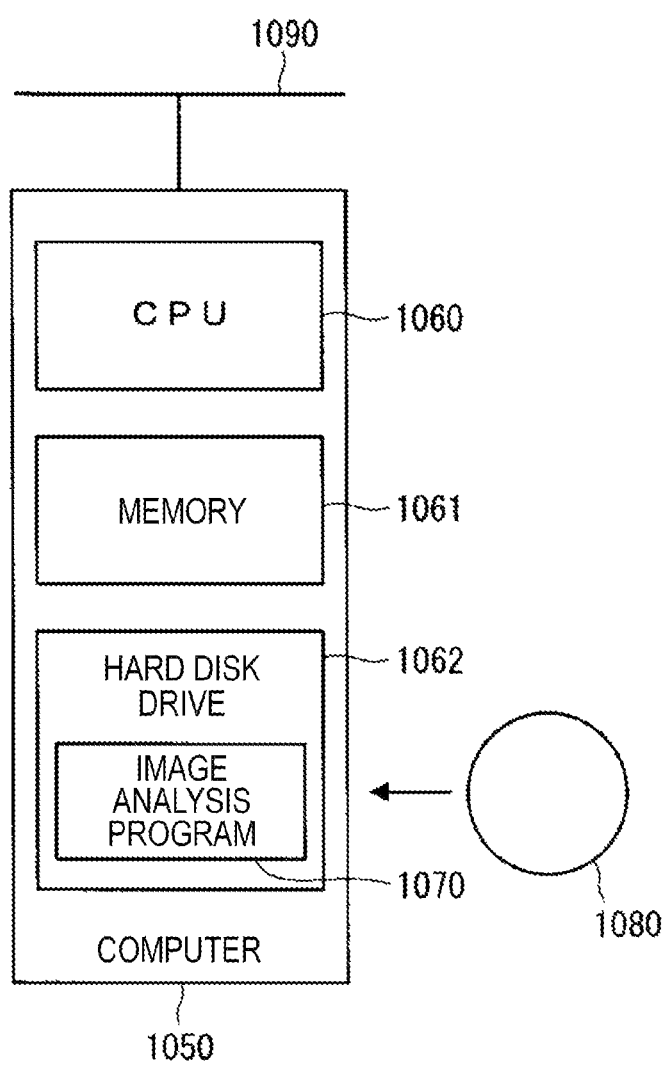
FIG. 10 is a block diagram of a computer of the first embodiment.

FIG. 10 is a block diagram of a computer.

The computer 1050 shown in FIG. 10 includes a CPU 1060, a memory 1061, and a hard disk drive 1062, and serves as the image analysis device 1011. The hard disk drive 1062 may be replaced with an auxiliary storage device of some other kind. An image analysis program 1070 is installed into the hard disk drive 1062. The functions of the image analysis device 1011 are realized by the CPU 1060 loading the image analysis program 1070 into the memory 1061 and executing the image analysis program 1070. All of or some of the functions of the image analysis device 1011 may be realized by hardware that does not involve software. All of or some of the functions of the image analysis device 1011 may be realized by two or more computers. The image analysis program 1070 may be pre-installed into the hard disk drive 1062 prior to shipment of the computer 1050, or may be installed into the hard disk drive 1062 after shipment of the computer 1050. The image analysis program 1070 may be installed by reading of a recording medium 1080 such as an optical disk having the image analysis program 1070 recorded thereon, or may be installed by downloading via a network 1090.

(3) Second Embodiment

A second embodiment relates to an image analyzing unit that replaces the image analyzing unit of the first embodiment. The image analyzing unit of the second embodiment differs from the image analyzing unit of the first embodiment mainly in removal of the influence of heartbeat.

Figure 11:
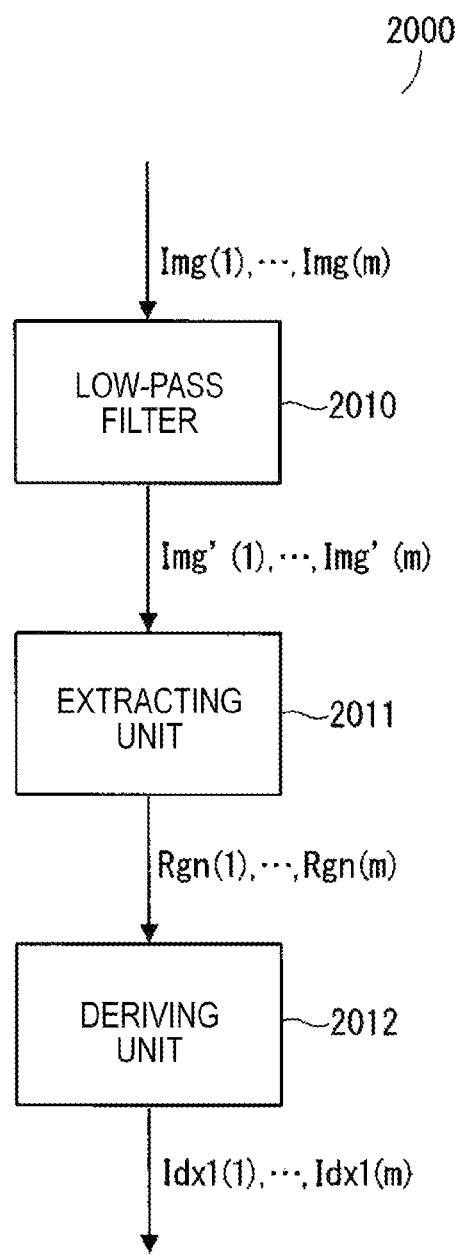
FIG. 11 is a block diagram of an image analyzing unit of a second embodiment.
Figure 12:
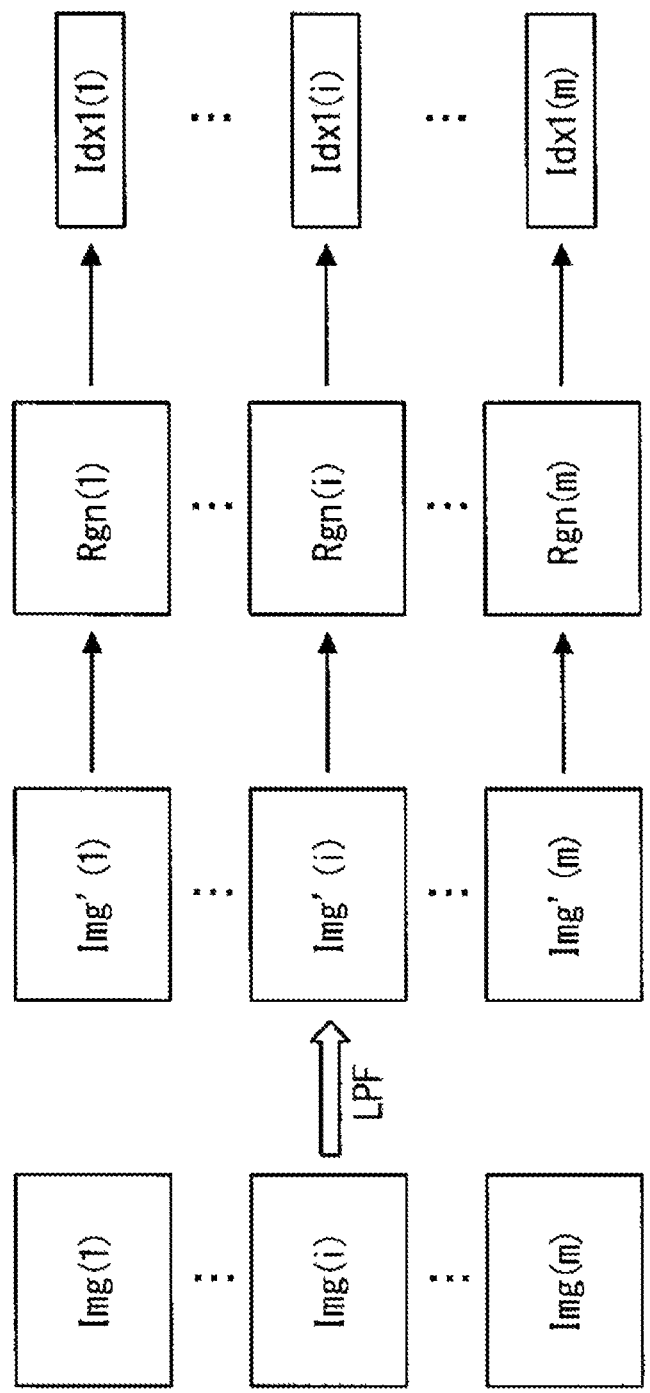
FIG. 12 is a schematic diagram showing the details of an image analysis according to the second embodiment.

The block diagram in FIG. 11 shows the image analyzing unit of the second embodiment. The schematic diagram in FIG. 12 shows the details of an image analysis according to the second embodiment.

The image analyzing unit 2000 shown in FIG. 11 includes a low-pass filter unit 2010, an extracting unit 2011, and a deriving unit 2012.

The low-pass filter unit 2010 applies a time-domain low-pass filter to two or more frame images Img(1) through Img(m). As a result, two or more frame images Img'(1) through Img'(m) subjected to time-domain low-pass filtering are obtained. The cutoff frequency of the low-pass filter is intermediate between the respiratory frequency and the heartbeat frequency as in the first embodiment. As a result, the influence of heartbeat is removed from the two or more frame images Img(1) through Img(m), and accordingly, the influence of heartbeat is removed from eventual two or more cardiac status indexes Idx1(1) through Idx1($m$).

The extracting unit 2011 extracts a heart region Rgn (i) from each frame image Img'(i) of the two or more frame images Img'(1) through Img'(m) subjected to low-pass filtering. As a result, two or more heart regions Rgn(1) through Rgn(m) are extracted. In a case where two or more cardiac status indexes Idx1(1) through Idx1($m$) are generated even if two or more heart regions Rgn(1) through Rgn(m) are not extracted, the extracting unit 2011 may not be provided as in the first embodiment.

The deriving unit 2012 derives a cardiac status index Idx1($i$) from a heart region Rgn(i) with respect to each frame image Img(i) of the two or more frame images Img(1) through Img(m). As a result, two or more cardiac status indexes Idx1(1) through Idx1($m$) are generated. In a case where an index Idx1($i$) indicating a cardiac status is generated, a cardiac parameter Idx3($i$) is generated in the same manner as the generation of a cardiac parameter Idx3($i$) from a heart region Rgn(i) in the first embodiment, and the cardiac parameter Idx3($i$) is set as the index Idx1($i$) indicating a cardiac status.

(4) Third Embodiment

A third embodiment relates to an image analyzing unit that replaces the image analyzing unit of the first embodiment. The image analyzing unit of the third embodiment differs from the image analyzing unit of the first embodiment mainly in removal of the influence of heartbeat.

Figure 13:
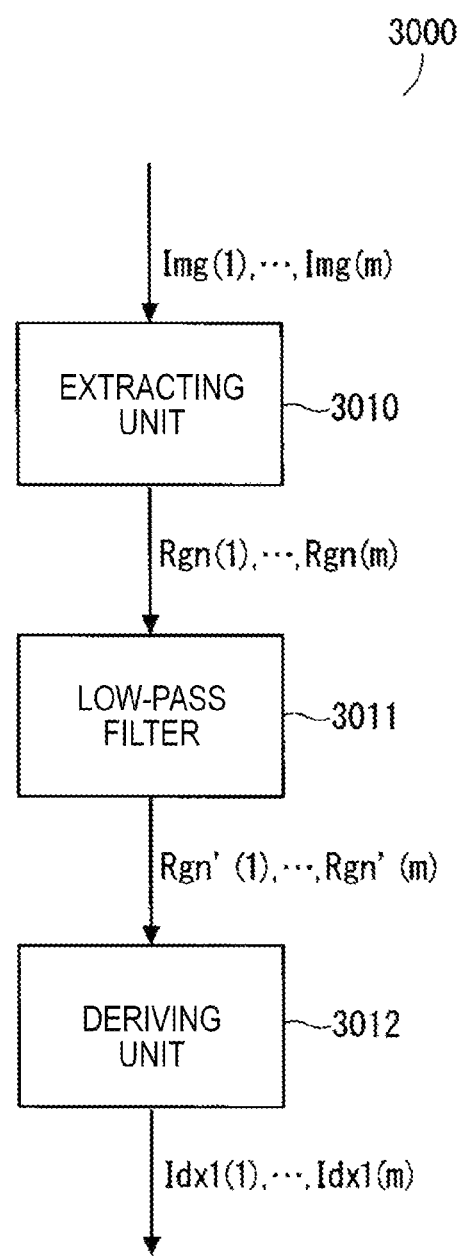
FIG. 13 is a block diagram of an image analyzing unit of a third embodiment.
Figure 14:
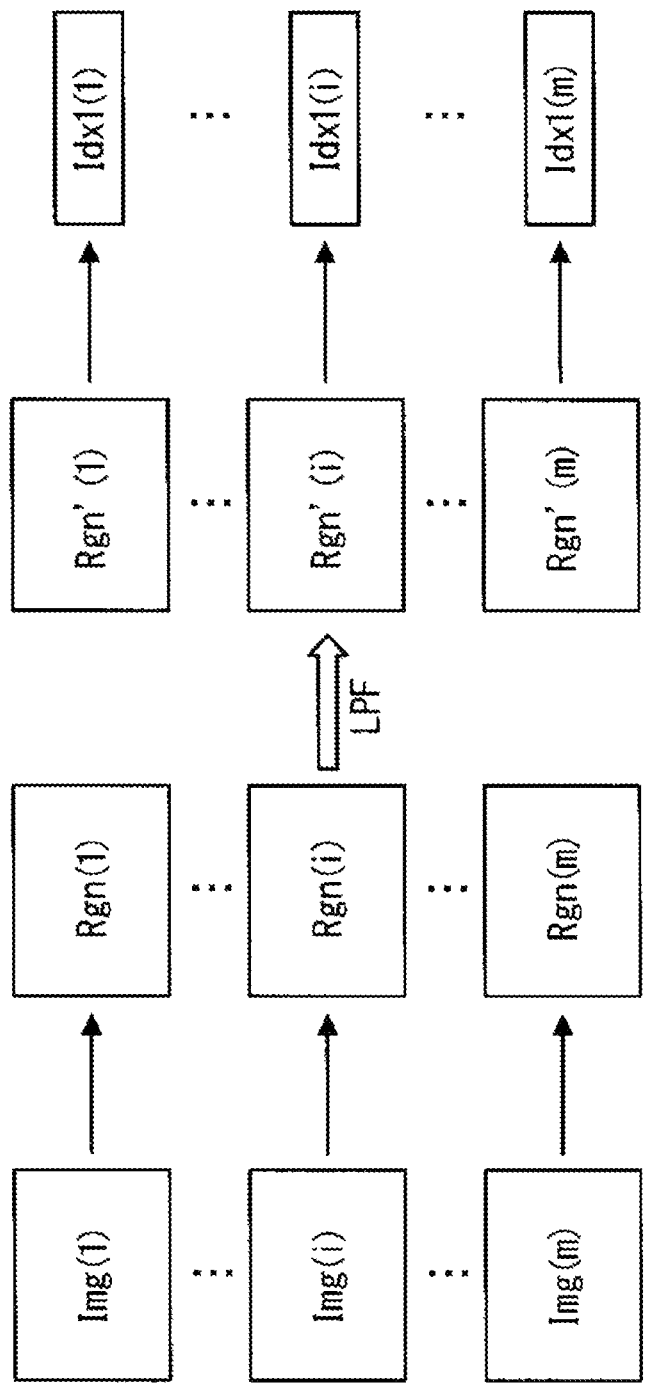
FIG. 14 is a schematic diagram showing the details of an image analysis according to the third embodiment.

The block diagram in FIG. 13 shows the image analyzing unit of the third embodiment. The schematic diagram in FIG. 14 shows the details of an image analysis according to the third embodiment.

The image analyzing unit 3000 shown in FIG. 13 includes an extracting unit 3010, a low-pass filter unit 3011, and a deriving unit 3012.

The extracting unit 3010 extracts a heart region Rgn(i) from each frame image Img(i) of two or more frame images Img(1) through Img(m). As a result, two or more heart regions Rgn(1) through Rgn(m) are extracted.

The low-pass filter unit 3011 applies a time-domain low-pass filter to the two or more heart regions Rgn(1) through Rgn(m). As a result, two or more heart regions Rgn'(1) through Rgn'(m) subjected to time-domain low-pass filtering are obtained. The cutoff frequency of the low-pass filter is intermediate between the respiratory frequency and the heartbeat frequency as in the first embodiment. As a result, the influence of heartbeat is removed from the two or more heart regions Rgn(1) through Rgn(m), and accordingly, the influence of heartbeat is removed from eventual two or more cardiac status indexes Idx1(1) through Idx1($m$).

The deriving unit 3012 derives a cardiac status index Idx1($i$) from a heart region Rgn'(i) with respect to each frame image Img(i) of the two or more frame images Img(1) through Img(m). As a result, two or more cardiac status indexes Idx1(1) through Idx1($m$) are generated. In a case where an index Idx1($i$) indicating a cardiac status is generated, a cardiac parameter Idx3($i$) is generated in the same manner as the generation of a cardiac parameter Idx3($i$) from a heart region Rgn(i) in the first embodiment, and the cardiac parameter Idx3($i$) is set as the index Idx1($i$) indicating a cardiac status.

(5) Fourth Embodiment (5.1) Index Analyzing Unit

A fourth embodiment relates to an index analyzing unit that replaces the index analyzing unit of the first embodiment. The index analyzing unit of the fourth embodiment differs from the index analyzing unit of the first embodiment mainly in derivation of an index indicating lung function. The replacement to be described in the fourth embodiment may be employed together with the replacement described in the second or third embodiment.

Figure 15:
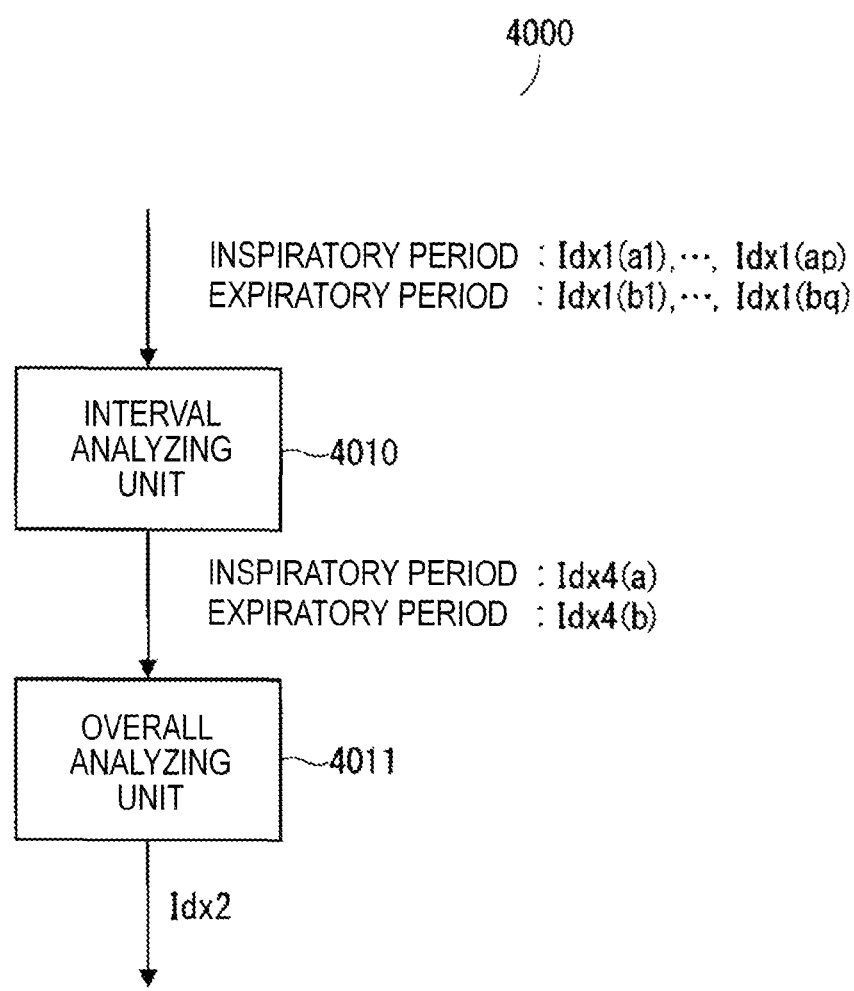
FIG. 15 is a block diagram of an index analyzing unit of a fourth embodiment.

The block diagram in FIG. 15 shows the index analyzing unit of the fourth embodiment.

The index analyzing unit 4000 shown in FIG. 15 includes an interval analyzing unit 4010 and an overall analyzing unit 4011. The interval analyzing unit 4010 derives an interval index from an index indicating a cardiac status. The overall analyzing unit 4011 derives a lung function index from the interval index.

(5.2) Interval Analyzing Unit

The interval analyzing unit 4010 sets an inspiratory interval index Idx4($a$) that is the average value of one or more cardiac status indexes Idx1($a$1) through Idx1($ap$) generated with respect to one or more frame images Img($a$1) through Img(ap) belonging to an inspiratory period in two or more frame images Img(1) through Img(m). The interval analyzing unit 4010 also sets an expiratory interval index Idx4($b$) that is the average value of one or more cardiac status indexes Idx1($b$1) through Idx1($bq$) generated with respect to one or more frame images Img($b$1) through Img(bq) belonging to an expiratory period in two or more frame images Img(1) through Img(m). As a result, the inspiratory interval index Idx4($a$) and the expiratory interval index Idx4($b$) are generated. The inspiratory interval index Idx4($a$) indicates a typical cardiac status during an inspiratory period, and the expiratory interval index Idx4($b$) indicates a typical cardiac status during an expiratory period. A change in an index indicating a cardiac status between an inspiratory period and an expiratory period can be derived from the inspiratory interval index Idx4($a$) and the expiratory interval index Idx4($b$).

The average value may be replaced with a representative value of some other kind. For example, the average value may be replaced with the median, the smallest value, the largest value, or the like. The average value may be replaced with one cardiac status index randomly selected from two or more cardiac status indexes. In a case where random selection is performed, precision might become slightly lower, but the process of generating an interval index is simplified.

(5.3) Assignment of Different Respiration Rates

The absolute value of a respiration rate is typically a ventilation volume per unit time, and the sign of the respiration rate is typically positive during an inspiratory period and is typically negative during an expiratory period. The definitions of the absolute value and the sign of a respiration rate may be changed. For example, the absolute value of a respiration rate may be the absolute value of the movement rate of the diaphragm in a medical moving image. The sign of a respiration rate may be negative during an inspiratory period and be positive during an expiratory period.

An inspiratory period is an interval to which a respiration rate with a positive sign is assigned, and an expiratory period is an interval to which a respiration rate with a negative sign is assigned. Therefore, an inspiratory period and an expiratory period are two intervals to which different respiration rate signs from each other are assigned. Instead of different respiration rate signs from each other, or in addition to different respiration rate signs from each other, different respiration rate absolute values from each other may be assigned to two or more intervals. More generally, different respiration rates from each other are assigned to the two or more intervals. Since a respiration rate varies with the pressure in the lungs, assignment of different respiration rates from each other to the two or more intervals enables detection of a change in the cardiac status due to the pressure in the lungs.

Preferably, the states where the respiration rate is almost zero are excluded from the inspiratory periods and the expiratory periods. Other than the inspiratory periods and the expiratory periods, intervals during which the respiration rate is almost zero may be set. The respiration rate becomes almost zero at the time of a transition from an inspiratory period to an expiratory period, and at the time of a transition from an expiratory period to an inspiratory period.

Part of an inspiratory period may be set as one interval, and part of an expiratory period may be set as the other interval. The same lung size is assigned to the one interval and the other interval. With this, the influence of the lung size is removed, and an index indicating a change caused in the cardiac status by the respiration rate is generated.

(5.4) Assignment of Different Lung Sizes

Instead of different respiration rates from each other, or in addition to different respiration rates from each other, different respiration statuses from each other in a different aspect from the respiration rate may be assigned to the two or more intervals. For example, different lung sizes from each other may be assigned to the two or more intervals.

In a case where different lung sizes from each other are assigned to the two or more intervals, different lung widths from each other, different lung areas from each other, different lung sizes from each other, or the like are assigned to the two or more intervals, or more preferably, different lung width in the vertical direction are assigned to the two or more intervals.

(5.5) Assignment of Different Respiration Phases

Different respiration phases from each other may be assigned to the two or more intervals. In a case where different respiration phases from each other are assigned to the two or more intervals, interval indexes are generated with respect to the six intervals of the initial stage, the middle stage, and the later stage of an inspiratory period, and the initial stage, the middle stage, and the later stage of an expiratory period. With this, indexes indicating changes caused in the cardiac status by the respiration phases are generated. The number of intervals included in one inspiratory period may be increased or decreased. The number of intervals included in one expiratory period may be increased or decreased. A respiration phase may be identified from the ventilation volume of the person being imaged, or may be identified from motion of the diaphragm or the lungs in the medical moving image.

(5.6) Interval Formed with an Entire Respiratory Cycle

The two or more intervals may include an interval formed with an entire respiratory cycle. For example, an inspiratory period or an expiratory period is set as one of the intervals, and an interval formed with an inspiratory period and an expiratory period may be set as the other interval. With this, a change in the cardiac status between an entire respiratory cycle and a particular respiratory status can be detected.

(5.7) Other Examples of Assignment

Different respiration methods from each other may be assigned to the two or more intervals. For example, natural respiration may be assigned to one of the intervals, and forced respiration may be assigned to the other interval. With this, indexes indicating changes caused in the cardiac status by the respiration methods are generated.

In addition to the different respiratory statuses from each other, different statuses from each other in a different aspect from the respiratory statuses may be assigned to the two or more intervals. For example, different postures from each other may be assigned to the two or more intervals. For example, an upright position may be assigned to one of the intervals, and a decubitus position may be assigned to the other interval.

(5.8) Overall Analyzing Unit

The overall analyzing unit 4011 sets the index Idx2 indicating lung function. The index Idx2 is the absolute value of the difference Idx4($a$)–Idx4($b$) between the inspiratory interval index Idx4($a$) and the expiratory interval index Idx4($b$). The index Idx2 indicating lung function may not be the absolute value of the difference Idx4($a$)–Idx4($b$). For example, a difference between the inspiratory interval index Idx4($a$) and the expiratory interval index Idx4($b$), such as a ratio Idx4($a$)/Idx4($b$) or Idx4($b$)/Idx4($a$), may be set as the index Idx2 indicating lung function. In a case where three or more interval indexes are generated, the variation among the three or more interval indexes, such as the variance or the standard deviation of the three or more interval indexes, may be set as the index Idx2 indicating lung function.

(5.9) Two or More Respiratory Cycles

In a case where cardiac status indexes are generated over two or more respiratory cycles, the cardiac status indexes generated over the two or more respiratory cycles are mapped in one respiratory cycle, and the cardiac status indexes generated over the two or more respiratory cycles are processed in the same manner as cardiac status indexes generated with respect to one respiratory cycle. Accordingly, changes caused in the cardiac status indexes by the respiratory statuses are detected in a robust manner. More preferably, only the cardiac status indexes generated with respect to respiratory cycles in which the respiration method remains the same are subjected to the mapping. For example, only the cardiac status indexes generated with respect to the respiratory cycles of natural respiration or only the cardiac status indexes generated with respect to the respiratory cycles of forced respiration are subjected to the mapping. Alternatively, the cardiac status indexes generated with respect to the respiratory cycles in which the respiration is disturbed may be excluded from those to be subjected to the mapping.

When mapping is performed in a case where inspiratory interval indexes and expiratory interval indexes are generated, two or more inspiratory periods are integrated to form one inspiratory period, and two or more expiratory periods are integrated to form one expiratory period. The average value of the cardiac status indexes generated with respect to the two or more inspiratory periods is set as the interval index of the one integrated inspiratory period, and the average value of the cardiac status indexes generated with respect to the two or more expiratory periods is set as the interval index of the one integrated expiratory period. An inspiratory interval index and an expiratory interval index may be generated with respect to each of the two or more respiratory cycles, the average value of the two or more inspiratory interval indexes may be set as one integrated interval index, and the average value of the two or more expiratory interval indexes may be set as one integrated interval index. The average value may be replaced with a representative value of some other kind. For example, the average value may be replaced with the median, the smallest value, the largest value, or the like. In a case where the representative value is the average value or the median, changes caused in the cardiac status indexes by the respiratory statuses are detected in a robust manner. In a case where the representative value is the largest value or the smallest value, a change caused in an unusual cardiac status by the respiratory statuses is detected.

(6) Fifth Embodiment (6.1) Image Analyzing Unit

A fifth embodiment relates to an image analyzing unit that replaces the image analyzing unit of the first embodiment. The image analyzing unit of the fifth embodiment differs from the image analyzing unit of the first embodiment mainly in cardiac status indexes. The replacement to be described in the fifth embodiment may be employed together with the replacement described in any of the second through fourth embodiments.

Figure 16:
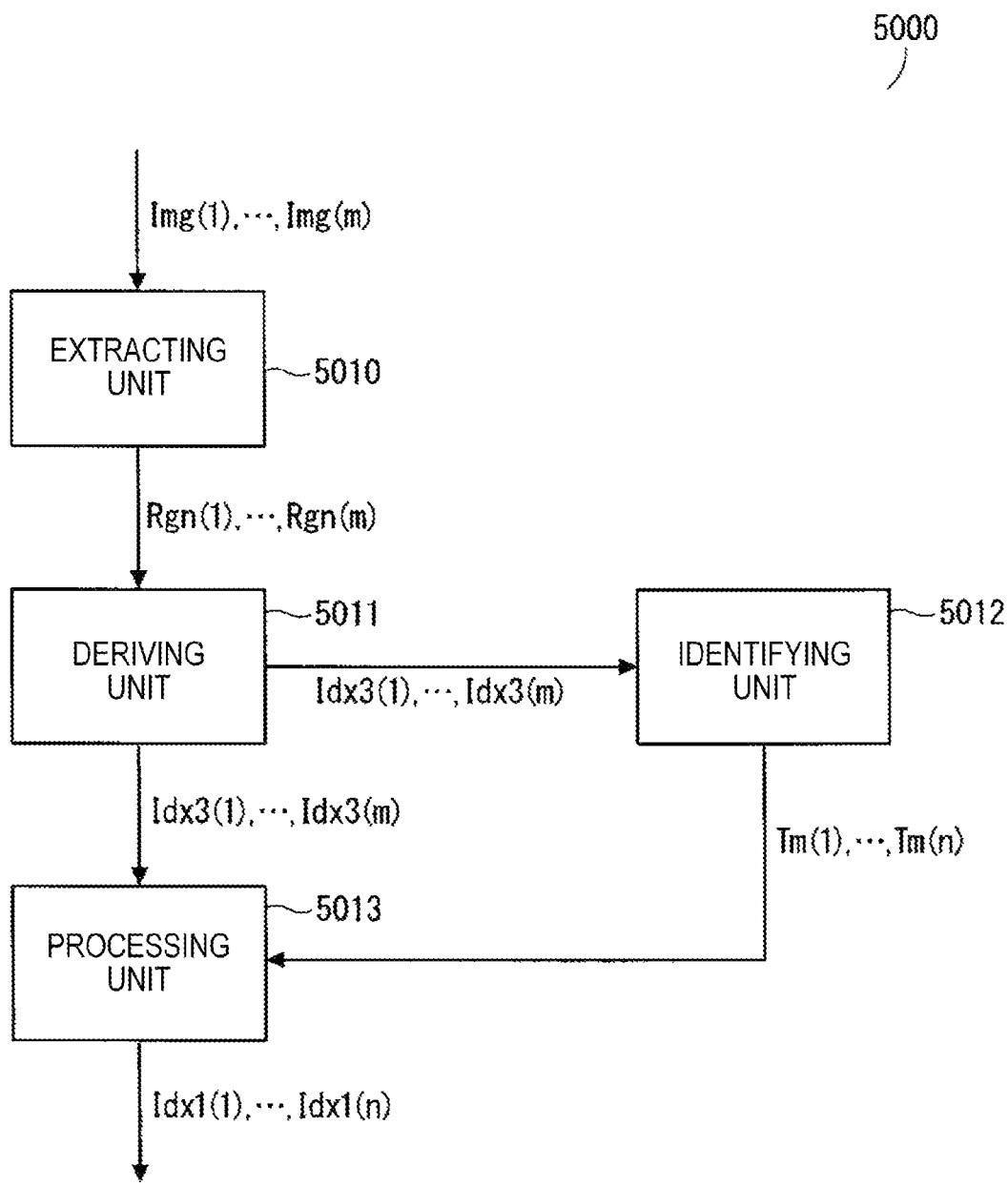
FIG. 16 is a block diagram of an image analyzing unit of a fifth embodiment.
Figure 17:
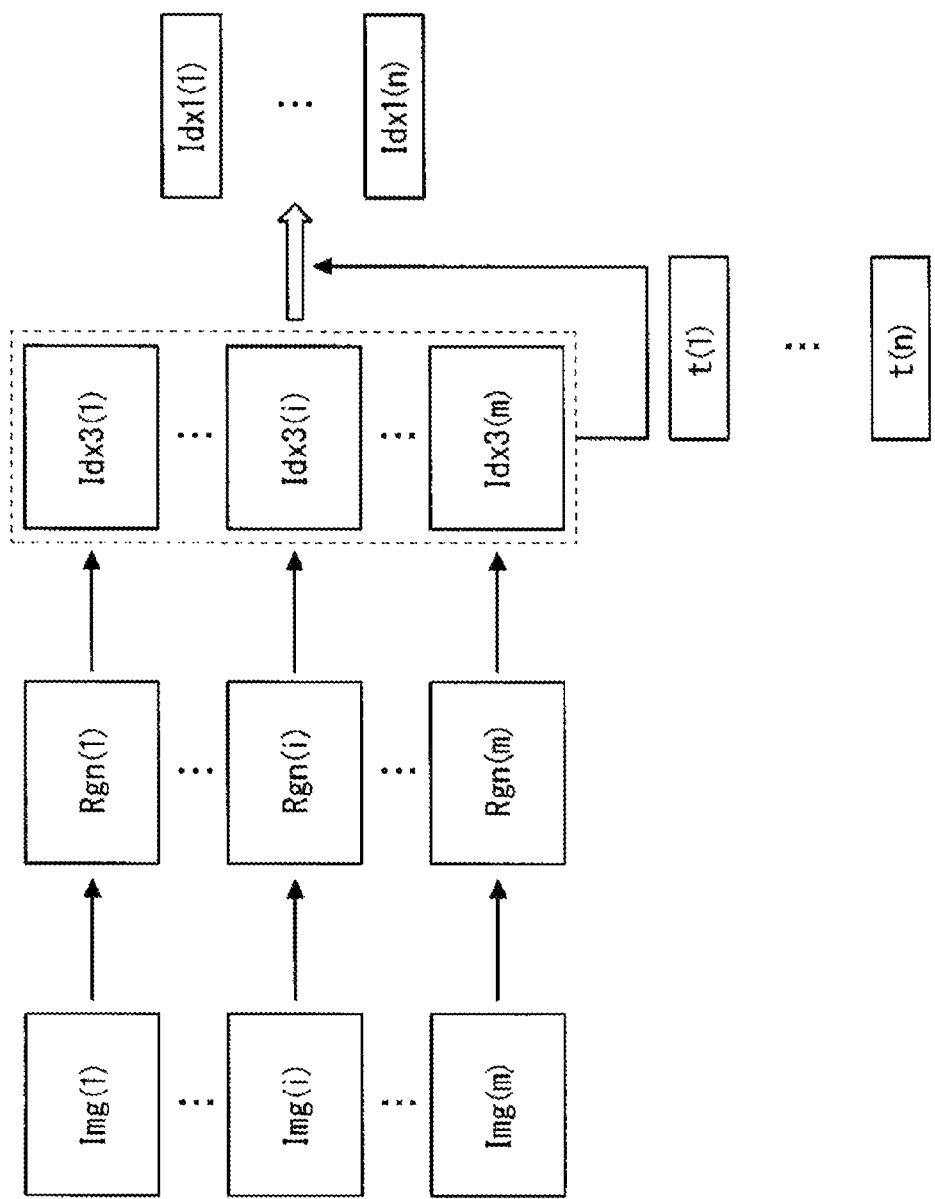
FIG. 17 is a schematic diagram showing the details of an image analysis according to the fifth embodiment.

The block diagram in FIG. 16 shows the image analyzing unit of the fifth embodiment. The schematic diagram in FIG. 17 shows the details of an image analysis according to the fifth embodiment.

The image analyzing unit 5000 shown in FIG. 16 includes an extracting unit 5010, a deriving unit 5011, an identifying unit 5012, and a processing unit 5013. The extracting unit 5010 extracts a heart region. The deriving unit 5011 derives a cardiac parameter from the heart region. The identifying unit 5012 identifies each time at which a heartbeat has occurred. The processing unit 5013 sets a cardiac status index that is a change caused in a cardiac parameter at a time when a heartbeat has occurred.

(6.2) Extracting Unit

The extracting unit 5010 extracts a heart region Rgn(i) from each frame image Img(i) of two or more frame images Img(1) through Img(m) as in the first embodiment. As a result, two or more heart regions Rgn(1) through Rgn(m) are extracted.

(6.3) Deriving Unit

The deriving unit 5011 derives a cardiac parameter Idx3($i$) from a heart region Rgn(i) with respect to each frame image Img(i) of the two or more frame images Img(1) through Img(m) as in the first embodiment. As a result, two or more cardiac parameters Idx3(1) through Idx3($m$) are generated. The two or more cardiac parameters Idx3(1) through Idx3($m$) represent a temporal variation of the cardiac parameter Idx3($i$).

(6.4) Example of Derivation of a Cardiac Parameter

Figure 18:
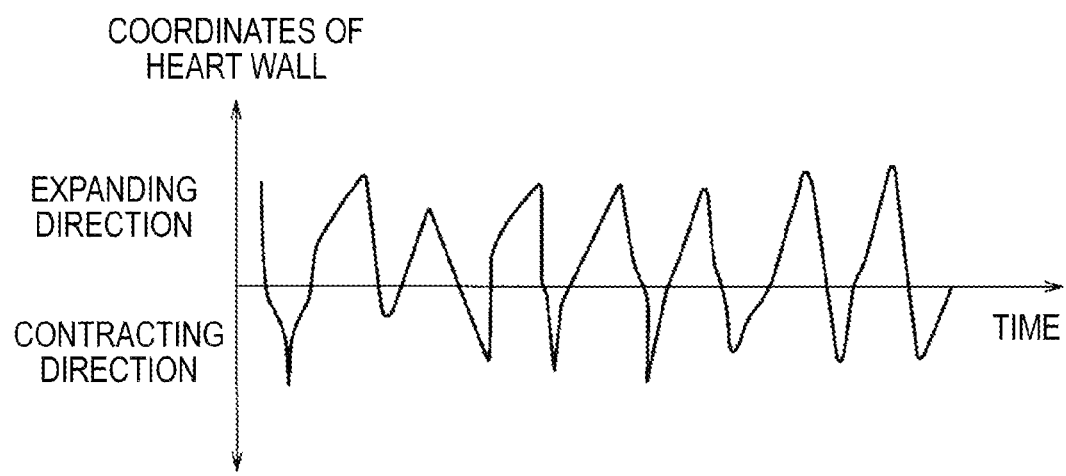
FIG. 18 is a schematic diagram (graph) showing an example of a temporal variation of the coordinates of the heart wall.

The schematic diagram in FIG. 18 shows an example of a temporal variation of the coordinates of the heart wall.

In a case where the temporal variation of the coordinates of the heart wall shown in FIG. 18 is detected, a difference between the coordinates of the heart wall in one frame image and the coordinates of the heart wall in the other frame image is detected.

(6.5) Identifying Unit

The identifying unit 5012 sets two or more times Tm(1) through Tm(n) at which a heartbeat has occurred. The two or more times Tm(1) through Tm(n) are two or more times at which the change in the cardiac parameter Idx3($i$) is equal to or larger than a reference value. The two or more times Tm(1) through Tm(n) at which a heartbeat has occurred may be identified by some other algorithm. For example, a change in the cardiac parameter Idx3($i$) that repeatedly appears in cycles in synchronization with the heartbeat cycles is identified, and two or more times at which the identified change has occurred may be set as the two or more times Tm(1) through Tm(n) at which a heartbeat has occurred. The heartbeat frequency of an average adult is 60 to 100 times per minute. Accordingly, a change in the cardiac parameter Idx3($i$) that repeatedly appears at the frequency of 60 to 100 Hz is identified, so that the influence of noise generated by body movement is reduced, and the two or more times Tm(1) through Tm(n) at which a heartbeat has occurred are identified. The two or more times Tm(1) through Tm(n) at which a heartbeat has occurred may be identified based on a result of detection performed by a detector other than the imaging device 1010. For example, the two or more times Tm(1) through Tm(n) at which a heartbeat has occurred may be identified based on a result of detection performed by an electrocardiograph.

(6.6) Processing Unit

The processing unit 5013 sets an index Idx1($i$) indicating a cardiac status. The index Idx1($i$) is the change in the cardiac parameter Idx3($i$) during the heartbeat cycle including each time Tm(i) of the two or more times Tm(1) through Tm(n) at which a heartbeat has occurred. As a result, two or more cardiac status indexes Idx1(1) through Idx1(n) are generated. The two or more cardiac status indexes Idx1(1) through Idx1(n) may be generated by some other algorithm.

Each index Idx1(i) indicating a cardiac status is a change caused in the position of the heart wall by heartbeat, a change caused in the heart size by heartbeat, a change caused in the pixel value of a heart region by heartbeat, or the like. Normalization may be performed in the index Idx1(i) indicating a cardiac status. For example, a change caused in the width of the heart by heartbeat may be normalized with the width of the heart. Normalization may be performed with a value reflecting the size of the heart, other than the width of the heart. For example, normalization may be performed with the perimeter of the heart region in a case where the frame images are two-dimensional images, and normalization may be performed with the surface area of the heart region in a case where the frame images are three-dimensional images.

Two or more times Tm(1) through Tm(n) at which a heartbeat has occurred may be identified from one cardiac parameter, and a change in another cardiac parameter in the heartbeat cycle including each time Tm(i) of the two or more times Tm(1) through Tm(n) at which heartbeat has occurred may be set as an index Idx1(i) indicating a cardiac status. For example, two or more times Tm(1) through Tm(n) at which a change in the pixel value of the heart region is equal to or larger than a reference value and a heartbeat has occurred may be identified, and a change in the coordinates of the heart wall in the heartbeat cycle including each time Tm(i) of the two or more times Tm(1) through Tm(n) at which heartbeat has occurred may be set as an index Idx1(i) indicating a cardiac status.

Figure 19:
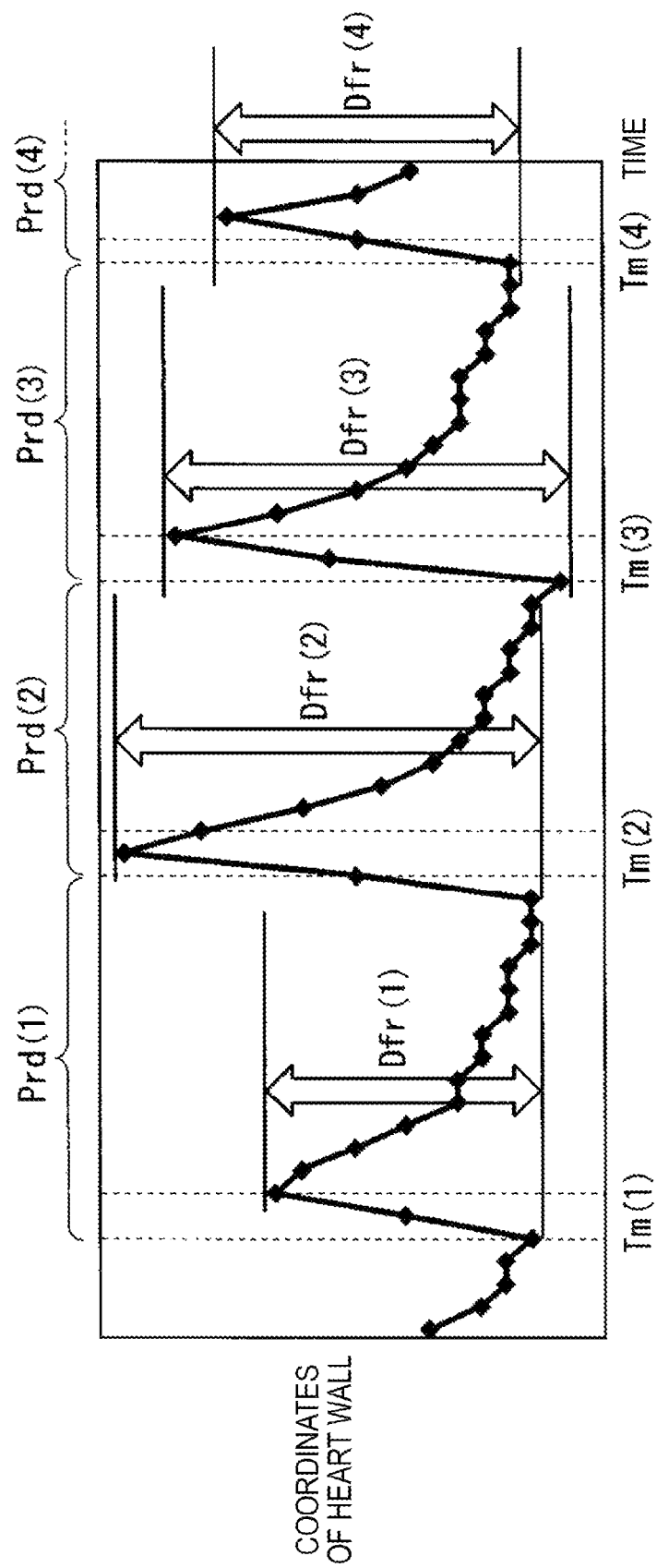
FIG. 19 is a schematic diagram showing an example of a temporal variation of the coordinates of the heart wall.

(6.7) Example of Identification of Times at which a Heartbeat has Occurred, and Derivation of Index Indicating a Cardiac Status The schematic diagram in FIG. 19 shows an example of a temporal variation of the coordinates of the heart wall. FIG. 19 shows an example of identification of four times at which a heartbeat has occurred and derivation of four cardiac status indexes in a case where the coordinates of the heart wall have been detected as a cardiac parameter.

The coordinates of the heart wall shown in FIG. 19 normally become larger rapidly with time at times Tm(1), Tm(2), Tm(3), and Tm(4) at which a heartbeat has occurred, and become smaller slowly with time until another heartbeat starts after the end of one heartbeat. With such a feature of the temporal variation of the coordinates of the heart wall being taken advantage of, the times Tm(1), Tm(2), Tm(3), and Tm(4) at which a heartbeat has occurred are identified, and changes Dfr(1), Dfr(2), Dfr(3), and Dfr(4) caused in the coordinates of the heart wall by heartbeat are detected.

In a case where the times Tm(1), Tm(2), Tm(3), and Tm(4) at which a heartbeat has occurred are identified, temporal differentiation is performed on the coordinates of the heart wall, the derivatives of the coordinates of the heart wall are determined, and the derivatives of the coordinates of the heart wall are set as the times Tm(1), Tm(2), Tm(3), and Tm(4) at which a heartbeat has occurred.

In a case where the changes Dfr(1), Dfr(2), Dfr(3), and Dfr(4) caused in the coordinates of the heart wall by heartbeat are detected, time is divided into heartbeat cycles Prd(1), Prd(2), Prd(3), and Prd(4). The heartbeat cycles Prd(1), Prd(2), Prd(3), and Prd(4) include the times Tm(1), Tm(2), Tm(3), and Tm(4), respectively. A difference Dfr(i) between the largest value and the smallest value of the coordinates of the heart wall is detected in each heartbeat cycle Prd(i) of the heartbeat cycles Prd(1), Prd(2), Prd(3), and Prd(4). As a result, differences Dfr(1), Dfr(2), Dfr(3), and Dfr(4) between the largest values and the smallest values of the coordinates of the heart wall are detected. The differences Dfr(1), Dfr(2), Dfr(3), and Dfr(4) between the largest values and the smallest values of the coordinates of the heart wall are set as cardiac status indexes Idx1(1), Idx1(2), Idx1(3), and Idx1(4), respectively. The difference Dfr(i) between the largest value and the smallest value of the coordinates of the heart wall may be replaced with a value of some other kind that also indicates a change in the coordinates of the heart wall. For example, the difference may be replaced with a ratio. The times at which a heartbeat has occurred may be identified from a temporal variation of a cardiac parameter other than the coordinates of the heart wall. For example, the times at which a heartbeat has occurred may be identified from a temporal variation of the pixel value in a heart region.

(6.8) Examples of Changes Caused in a Cardiac Parameter by Heartbeat

Figure 20:
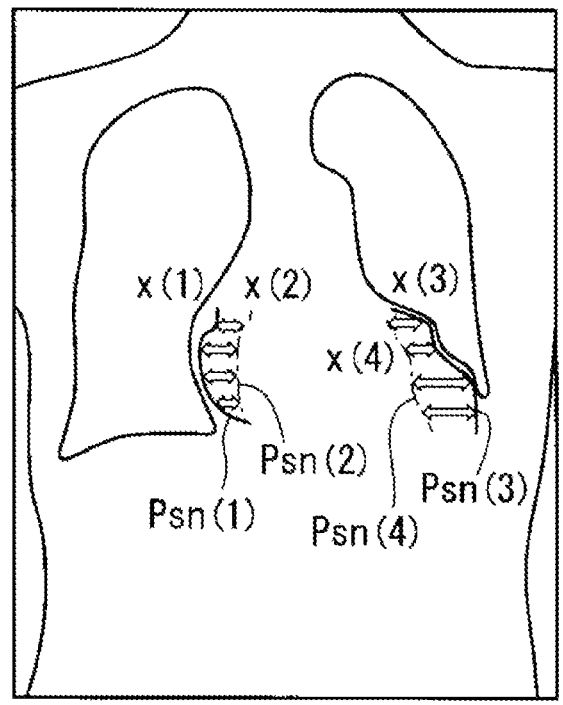
FIG. 20 is a schematic diagram showing an example of a change caused in the coordinates of the heart wall by heartbeat.

The schematic diagram in FIG. 20 shows an example of a change caused in the coordinates of the heart wall by heartbeat.

In the example shown in FIG. 20, one frame image shows a position Psn(1) representing one portion of the heart wall and a position Psn(3) representing another portion of the heart wall, and the other frame image shows a position Psn(2) representing the one portion of the heart wall and a position Psn(4) representing the other portion of the heart wall. In a case where the positions Psn(1), Psn(2), Psn(3), and Psn(4) are expressed by x-direction coordinate values x(1), x(2), x(3), and x(4), respectively, the change caused in the coordinates of the one portion of the heart wall by heartbeat is equal to a difference x(2)−x(1) or x(1)−x(2) between the coordinate value x(1) in the one frame image and the coordinate value x(2) in the other frame image, and the change caused in the coordinates of the other portion of the heart wall by heartbeat is equal to a difference x(4)−x(3) or x(3)−x(4) between the coordinate value x(3) in the one frame image and the coordinate value x(4) in the other frame image.

Figure 21:
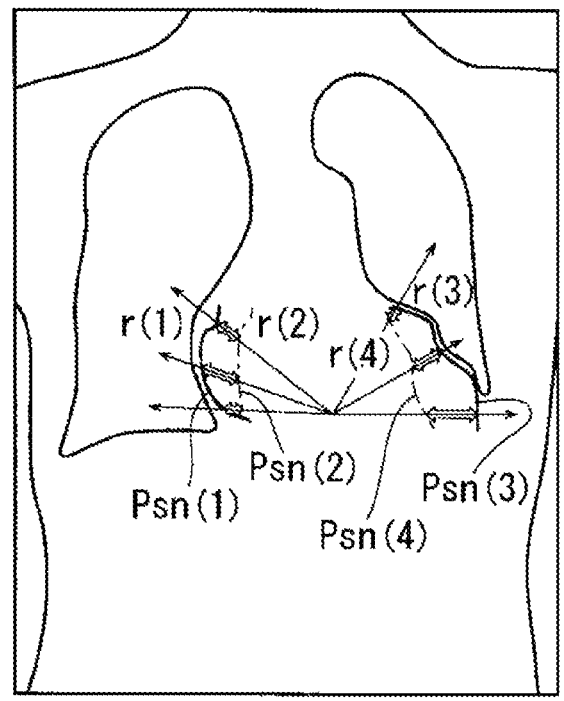
FIG. 21 is a schematic diagram showing an example of a change caused in the coordinates of the heart wall by heartbeat.

The schematic diagram in FIG. 21 shows an example of a change caused in the coordinates of the heart wall by heartbeat.

In the example shown in FIG. 21, one frame image shows a position Psn(1) representing one portion of the heart wall and a position Psn(3) representing another portion of the heart wall, and the other frame image shows a position Psn(2) representing the one portion of the heart wall and a position Psn(4) representing the other portion of the heart wall. In a case where the positions Psn(1), Psn(3), Psn(2), and Psn(4) are expressed by distances r(1), r(2), r(3), and r(4) from a reference point, respectively, the change caused in the coordinates of the one portion of the heart wall by heartbeat is equal to a difference r(2)−r(1) or r(1)−r(2) between the distance r(1) in the one frame image and the distance r(2) in the other frame image, and the change caused in the coordinates of the other portion of the heart wall by heartbeat is equal to a difference r(4)−r(3) or r(3)−r(4) between the distance r(3) in the one frame image and the distance r(4) in the other frame image.

Figure 22:
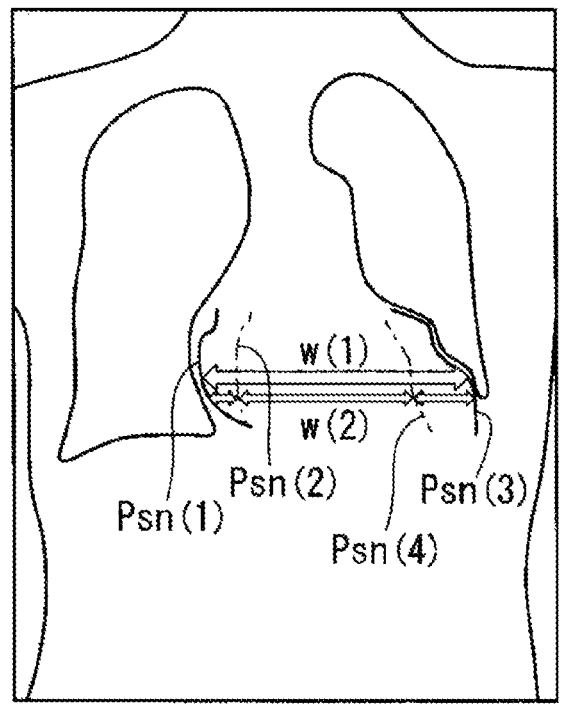
FIG. 22 is a schematic diagram showing an example of a change caused in the width of the heart wall by heartbeat.

The schematic diagram in FIG. 22 shows an example of a change caused in the width of the heart wall by heartbeat.

In the example shown in FIG. 22, one frame image shows a position Psn(1) representing one portion of the heart wall and a position Psn(3) representing another portion of the heart wall, and the other frame image shows a position Psn(2) representing the one portion of the heart wall and a position Psn(4) representing the other portion of the heart wall. The width of the heart in the one frame image is equal to the distance w(1) in the x-direction from the one portion of the heart wall to the other portion of the heart wall, the width of the heart in the other frame image is equal to the distance w(2) in the x-direction from the one portion of the heart wall to the other portion of the heart wall, and the change caused in the width of the heart by heartbeat is equal to a difference w(2)−w(1) or w(1)−w(2) between the width w(1) of the heart in the one frame image and the width w(2) of the heart in the other frame image.

Figure 23:
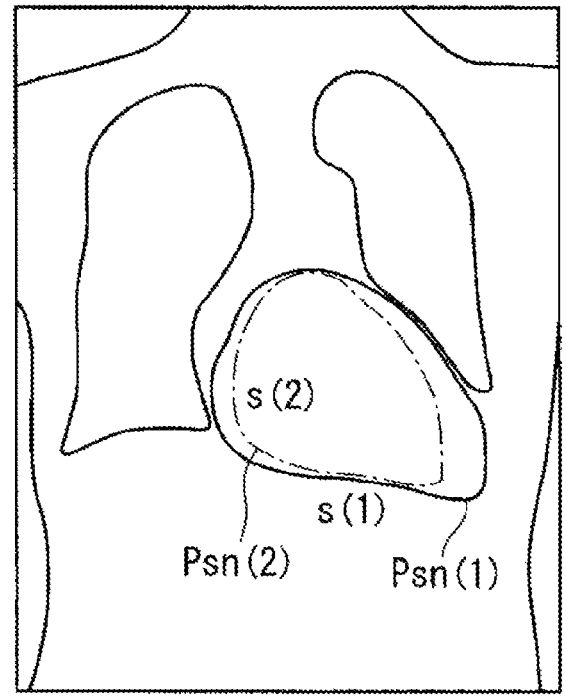
FIG. 23 is a schematic diagram showing an example of a change caused in the area of the heart wall by heartbeat.

The schematic diagram in FIG. 23 shows an example of a change caused in the area of the heart by heartbeat.

In the example shown in FIG. 23, one frame image shows a position Psn(1) representing the heart wall, and the other frame image shows a position Psn(2) representing the heart wall. The change in the area of the heart is equal to a difference s(1)−s(2) or s(2)−s(1) between the area s(1) of the heart in the one frame image and the area s(2) of the heart in the other frame image.

(6.9) Examples of Cardiac Status Indexes and Lung Function Indexes

The schematic diagram in FIG. 24 shows examples of cardiac status indexes and lung function indexes. In FIG. 24, as to each of a COPD patient and a healthy person, changes caused in a cardiac parameter by heartbeat are shown as cardiac status indexes in the columns of "heartbeat 1" through "heartbeat 6"; the largest value, the smallest value, the average value, and the median of the six changes caused in the cardiac parameter by heartbeat are shown in the columns of "Max", "Min", "Average", and "Median", respectively; and a difference between the largest value and the smallest value, a ratio between the largest value and the smallest value, and the standard deviation are shown as lung function indexes in the columns of "Max−Min (difference)", "Max/Min (ratio)", and "standard deviation σ", respectively.

In the example shown in FIG. 24, the lung function indexes of the COPD patient are larger than the lung function indexes of the healthy person. In view of this, indexes indicating lung function are useful in determining whether a person is affected with COPD, and COPD is suspected when all or some of the indexes indicating lung function are larger than threshold values. For example, if the ratio between the largest value and the smallest value is equal to or higher than 1.5 times the threshold value, COPD is suspected.

(6.10) Two or More Respiratory Cycles

In a case where indexes each indicating a cardiac status are generated over two or more respiratory cycles, the cardiac status indexes generated over the two or more respiratory cycles are mapped in one respiratory cycle. In the fifth embodiment, indexes each indicating a cardiac status at a time when a heartbeat has occurred can be generated, but indexes indicating the cardiac statuses at random times cannot be generated. Therefore, indexes indicating cardiac statuses cannot be generated at shorter time intervals than the heartbeat cycles. In a case where cardiac status indexes generated over two or more respiratory cycles are mapped in one respiratory cycle, the respiratory statuses in which indexes indicating cardiac statuses are generated are expected to vary in each of the two or more respiratory cycles, and an index indicating a cardiac status can be generated in each of many respiratory statuses.

Figure 26:
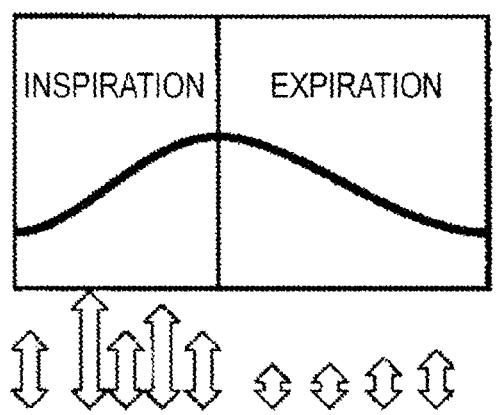
FIG. 26 is a schematic diagram showing an example of motion of the heart wall after mapping is performed.

The schematic diagrams in FIGS. 25 and 26 show examples of changes (motion of the heart wall) caused in the coordinates of the heart wall by heartbeat before and after mapping is performed. FIG. 25 shows a situation before mapping is performed, and FIG. 26 shows a situation after mapping is performed.

In the pre-mapping situation shown in FIG. 25, motion of the heart wall is not frequently detected, because an index that indicates motion of the heart wall cannot be generated at shorter time intervals than the heartbeat cycles. In the post-mapping situation shown in FIG. 26, on the other hand, an index that indicates motion of the heart wall is frequently generated.

(6.11) Medical Moving Image

In a case where the image analyzing unit of the fifth embodiment replaces the image analyzing unit of the first embodiment, a region including the entire heart is preferably imaged. As a result, an index indicating a cardiac status is generated with respect to each of the left ventricle, the left atrium, the right ventricle, and the right atrium, which function differently from one another, and cardiac status indexes suitable for purposes can be generated. For example, so as to generate a cardiac status index with high precision, a cardiac status index is generated with respect to a site where motion due to heartbeat. So as to generate indexes indicating cardiac statuses corresponding to a large number of respiratory statuses, indexes indicating cardiac statuses are generated with respect to two or more sites that move at different times from each other.

A medical moving image is taken over one or more respiratory cycles. Furthermore, a medical moving image is taken so that the heartbeat with respect to two or more respiratory statuses required in detecting a change caused in a cardiac status index by respiratory statuses is captured. Accordingly, a change caused in a cardiac parameter by heartbeat is detected, and a cardiac status is detected.

The taking of a medical moving image is ended when an imaging system determines that imaging of two or more respiratory statuses required in detecting a change caused in a cardiac status index by a respiratory status has been completed, and the heartbeat in each of the two or more respiratory statuses has been successfully captured. The determination as to whether the heartbeat has been captured is performed based on the motion of the heart in the medical moving image. The determination as to whether the heartbeat has been captured may be performed based on a result of detection performed by a detector other than the imaging device. For example, the determination as to whether the heartbeat has been captured may be performed based on a result of detection performed by an electrocardiograph. The taking of a medical moving image may be ended in accordance with an operation performed by an operator.

In a case where X-rays of a rectangular waveform are successively generated over one heartbeat cycle, a situation where the heart size is maximized and a situation where the heart size is minimized are depicted in two or more frame images, respectively. Accordingly, a change caused in a cardiac parameter by heartbeat is detected from the two or more frame images.

Although the present invention has been described and illustrated in detail, it is clearly understood that the same is by way of illustrated and example only and is not to be taken by way of limitation, the scope of the present invention being interpreted by terms of the appended claims. Therefore, it should be understood that numerous changes and modifications can be made to them without departing form the scope of the invention.

What is claimed is:

1. An image analysis device comprising:
   an acquiring unit configured to acquire a moving image showing a variation of a respiratory status, the moving image being formed with frame images comprising an image of a heart;
   an image analyzing unit that receives the moving image from the acquiring unit, wherein the image analyzing unit is configured to generate from the moving image a first index indicating a cardiac status with respect to each of the frame images, wherein each of the first indexes is one of a heart size, and a pixel value of a region in which the heart is depicted; and
   an index analyzing unit that receives the first indexes for each of the frame images, wherein the index analyzing unit is configured to derive a second index indicating lung function from a change caused in the first indexes of the frame images by the respiratory status.

2. The image analysis device according to claim 1, wherein the image analyzing unit comprises:
   a third index deriving unit configured to derive a third index with respect to each of the frame images, the third index indicating a cardiac status and comprising influence of heartbeat; and
   a removing unit configured to derive the first index by removing the influence of heartbeat from the third index.

3. The image analysis device according to claim 2, wherein the removing unit determines a representative value of the third indexes generated with respect to the frame images taken over one or more heartbeat cycles including times when the respective frame images are taken, and removes the influence of heartbeat by setting the representative value of the third index as the first index with respect to each of the frame images.

4. The image analysis device according to claim 3, wherein the representative value of the third index is one of an average value, a smallest value, a largest value, and a median of values of cardiac parameters.

5. The image analysis device according to claim 2, wherein the removing unit removes the influence of heartbeat by applying a time-domain low-pass filter to the third index.

6. The image analysis device according to claim 1, wherein the image analyzing unit comprises:
   a low-pass filter unit configured to apply a time-domain low-pass filter to the frame images and obtain frame images subjected to low-pass filtering; and
   a first index deriving unit configured to derive the first index with respect to each of the frame images subjected to the low-pass filtering.

7. The image analysis device according to claim 1, wherein the image analyzing unit comprises:
   an extracting unit configured to extract heart regions by extracting a heart region from each of the frame images
   a low-pass filter unit configured to apply a time-domain low-pass filter to the heart regions and obtain heart regions subjected to low-pass filtering; and
   a first index deriving unit configured to derive the first index from each of the heart regions subjected to the low-pass filtering.

8. An image analysis device comprising:
   an acquiring unit configured to acquire a moving image showing a variation of a respiratory status, the moving image being formed with frame images comprising an image of a heart;
   an image analyzing unit that receives the moving image from the acquiring unit, wherein the image analyzing unit is configured to generate from the moving image a first index indicating a cardiac status with respect to each of the frame images, wherein each of the first indexes is one of a change caused in a position of a heart wall by heartbeat, a change caused in a heart size by heartbeat, and a change caused in a pixel value of a region in which the heart is depicted by heartbeat; and
   an index analyzing unit that receives the first indexes for each of the frame images, wherein the index analyzing unit is configured to derive a second index indicating lung function from a change caused in the first indexes of the frame images by the respiratory status.

9. The image analysis device according to claim 8, wherein the image analyzing unit comprises:
   a third index deriving unit configured to derive a third index with respect to each of the frame images, the third index indicating a cardiac status and including influence of heartbeat;
   an identifying unit configured to identify times when a heartbeat occurs; and
   a processing unit configured to set the first index by determining that the first index is a change in the third index during heartbeat cycles including the respective times when a heartbeat occurs.

10. The image analysis device according to claim 9 wherein the identifying unit determines that the times when a heartbeat occurs are times when a change in the third index is equal to or larger than a reference value.

11. The image analysis device according to claim 1, wherein the second index is one of a difference between the largest value and the smallest value of the first indexes and variation among the first indexes.

12. The image analysis device according to claim 1, wherein the index analyzing unit generates a primary index reflecting one of a difference between the largest value and the smallest value of the first indexes and variation among the first indexes, and further derives a secondary index indicating lung function from the primary index.

13. The image analysis device according to claim 1, wherein the index analyzing unit comprises:
   an interval analyzing unit configured to generate two or more interval indexes by deriving an interval index of each of two or more intervals from one or more first indexes generated with respect to one or more frame images belonging to each of the two or more intervals; and
   an overall analyzing unit configured to derive the second index from the two or more interval indexes.

14. The image analysis device according to claim 13, wherein different respiratory statuses from each other are assigned to the two or more intervals.

15. The image analysis device according to claim 14, wherein the different respiratory statuses from each other are different respiration rates from each other, different lung sizes from each other, or different respiration phases from each other.

16. The image analysis device according to claim 1, wherein the moving image is obtained by imaging the heart over one or more respiratory cycles.

17. An imaging system comprising:
- an imaging device configured to generate a medical moving image including a moving image formed with frame images including an image of a heart; and
- image analysis device that receives the medical moving image, wherein the image analysis device comprises:
  - an acquiring unit configured to acquire the medical moving image, wherein the medical moving image shows a variation of a respiratory status and comprises an image of a heart;
  - an image analyzing unit configured to generate a first index indicating a cardiac status with respect to each of the frame images, wherein each of the first indexes is one of a heart size, a pixel value of a region in which the heart is depicted, a change caused in a position of a heart wall by heartbeat, a change caused in a heart size by heartbeat, and a change caused in a pixel value of a region in which the heart is depicted by heartbeat; and
  - an index analyzing unit configured to derive a second index indicating lung function from a change caused in the first indexes by the respiratory status.

18. A non-transitory recording medium storing a computer readable program which analyzes an image and causes a computer to carry out:
- acquiring a moving image showing a variation of a respiratory status, the moving image being formed with frame images including an image of a heart;
- generating a first index indicating a cardiac status with respect to each of the frame images, wherein each of the first indexes is one of a heart size, a pixel value of a region in which the heart is depicted, a change caused in a position of a heart wall by heartbeat, a change caused in a heart size by heartbeat, and a change caused in a pixel value of a region in which the heart is depicted by heartbeat; and
- deriving a second index indicating lung function from a change caused in the first indexes by the respiratory status.

19. The image analysis device of claim 1, wherein each of the first indexes is a heart size.

20. The image analysis device of claim 1, wherein each of the first indexes is a pixel value of a region in which the heart is depicted.

21. The image analysis device of claim 8, wherein each of the first indexes is a change caused in a position of a heart wall by heartbeat.

22. The image analysis device of claim 8, wherein each of the first indexes is a change caused in a heart size by heartbeat.

23. The image analysis device of claim 8, wherein each of the first indexes is a change caused in a pixel value of a region in which the heart is depicted by heartbeat.

24. The image system of claim 17, wherein each of the first indexes is a heart size.

25. The image system of claim 17, wherein each of the first indexes is a pixel value of a region in which the heart is depicted.

26. The image system of claim 17, wherein each of the first indexes is a change caused in a position of a heart wall by heartbeat.

27. The image system of claim 17, wherein each of the first indexes is a change caused in a heart size by heartbeat.

28. The image system of claim 17, wherein each of the first indexes is a change caused in a pixel value of a region in which the heart is depicted by heartbeat.

29. The non-transitory recording medium of claim 18, wherein each of the first indexes is a heart size.

30. The non-transitory recording medium of claim 18, wherein each of the first indexes is a pixel value of a region in which the heart is depicted.

31. The non-transitory recording medium of claim 18, wherein each of the first indexes is a change caused in a position of a heart wall by heartbeat.

32. The non-transitory recording medium of claim 18, wherein each of the first indexes is a change caused in a heart size by heartbeat.

33. The non-transitory recording medium of claim 18, wherein each of the first indexes is a change caused in a pixel value of a region in which the heart is depicted by heartbeat.

\* \* \* \* \*